United States Patent
Judd et al.

(10) Patent No.: US 11,448,493 B2
(45) Date of Patent: Sep. 20, 2022

(54) CALIBRATION OF WRITER OFFSET USING MEDIA DIMENSIONAL STABILITY

(71) Applicant: International Business Machines Corporation, Armonk, NY (US)

(72) Inventors: Kevin B. Judd, Tucson, AZ (US); Randy C. Inch, Tucson, AZ (US); David L. Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 16/201,739

(22) Filed: Nov. 27, 2018

(65) Prior Publication Data

US 2020/0166322 A1 May 28, 2020

(51) Int. Cl.
| | |
|---|---|
| *G11B 5/54* | (2006.01) |
| *G01B 3/1061* | (2020.01) |
| *G01B 3/1041* | (2020.01) |
| *G01B 3/1084* | (2020.01) |
| *G01B 3/1003* | (2020.01) |
| *G11B 5/008* | (2006.01) |
| *G01B 3/1094* | (2020.01) |

(52) U.S. Cl.
CPC ......... *G01B 3/1061* (2013.01); *G01B 3/1003* (2020.01); *G01B 3/1041* (2013.01); *G01B 3/1084* (2013.01); *G11B 5/00821* (2013.01); *G01B 3/1094* (2020.01)

(58) Field of Classification Search
CPC ... G11B 5/584; G11B 5/00826; G11B 5/4893; G11B 20/1201; G11B 5/02; G11B 5/48; G11B 5/00813; G11B 20/18; G11B 27/36

USPC .......................................................... 360/75
See application file for complete search history.

(56) References Cited

U.S. PATENT DOCUMENTS

| | | | |
|---|---|---|---|
| 5,946,156 A | 8/1999 | Schwarz et al. | |
| 7,307,809 B2 | 12/2007 | Neumann | |
| 7,649,707 B2 | 1/2010 | Saliba | |
| 7,660,069 B2 | 2/2010 | Trabert et al. | |
| 8,154,811 B2 | 4/2012 | Barsotti et al. | |
| 8,824,083 B1 * | 9/2014 | Kientz | G11B 5/584 |
| | | | 360/77.12 |
| 9,640,208 B2 | 5/2017 | Poorman et al. | |
| 2007/0041121 A1 | 2/2007 | Neumann | |
| 2008/0198503 A1 | 8/2008 | Saliba | |
| 2009/0268339 A1 | 10/2009 | Trabert et al. | |
| 2010/0246043 A1 | 9/2010 | Barsotti et al. | |
| 2016/0189737 A1 | 6/2016 | Poorman et al. | |

FOREIGN PATENT DOCUMENTS

WO     2015016922 A1     2/2015

* cited by examiner

*Primary Examiner* — Nabil Z Hindi
(74) *Attorney, Agent, or Firm* — Zilka-Kotab, P.C.

(57) ABSTRACT

In one embodiment, a method includes writing, using a magnetic head, a set of parallel shingled tracks onto a magnetic recording tape using specified drive parameters, changing one of the specified drive parameters, reading a set of selected data tracks on the magnetic recording tape using the changed drive parameter, changing a lateral head position while reading the set of selected data tracks using the changed drive parameter, comparing track error rates observed during reading at the different lateral head positions, selecting a reader offset value based on the comparing, and performing a further action using the selected reader offset value.

20 Claims, 18 Drawing Sheets

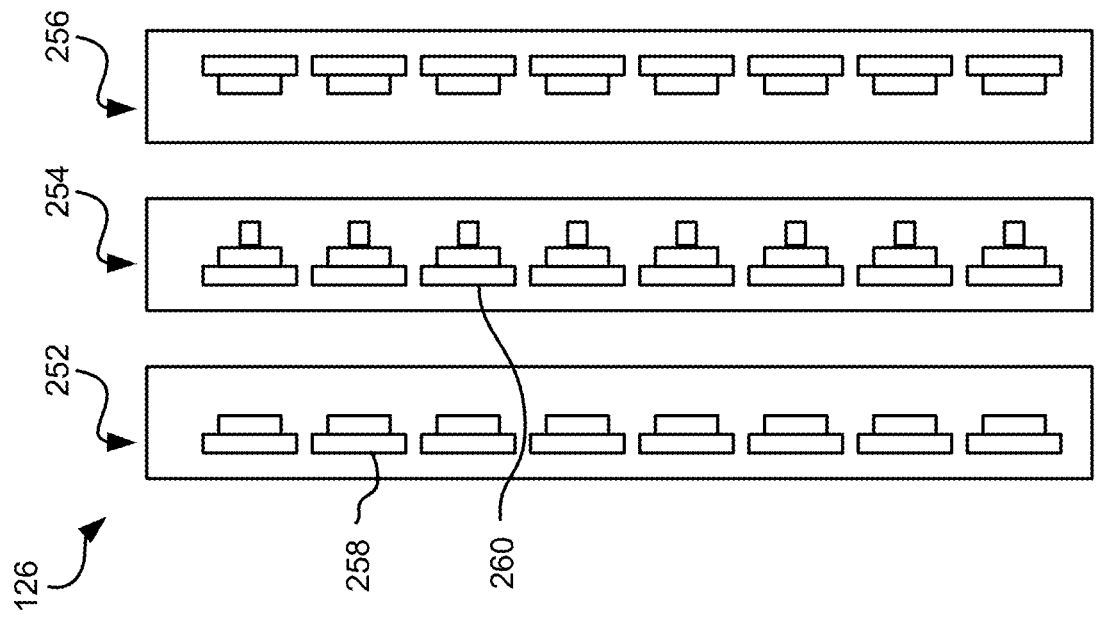
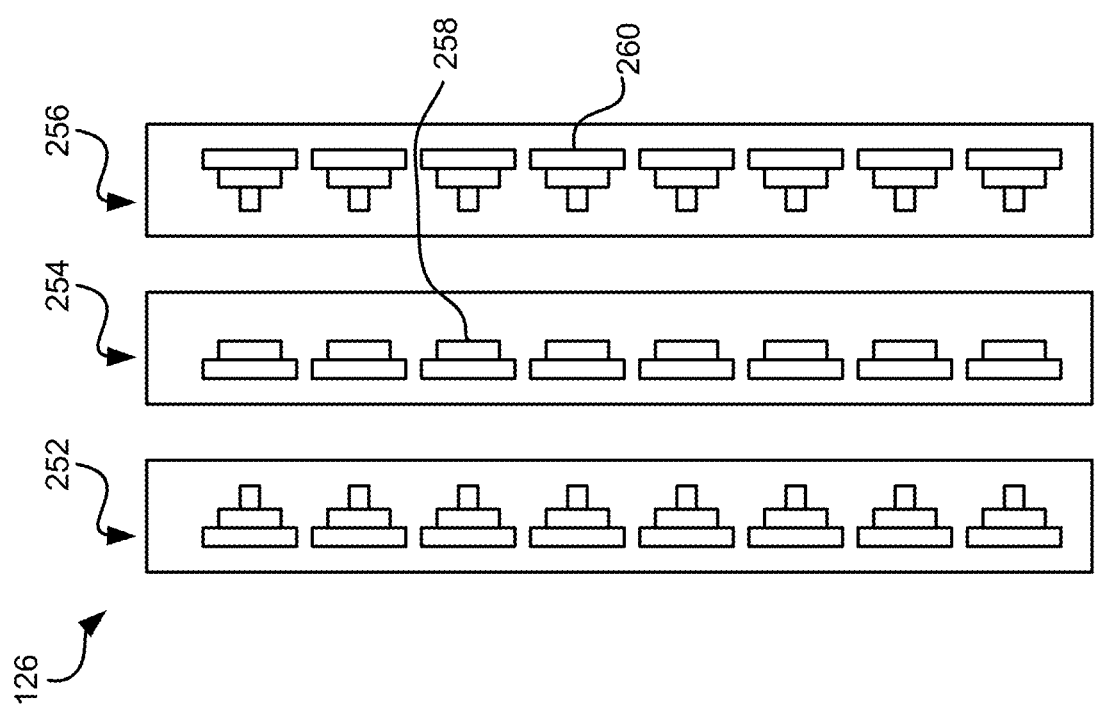

CALIBRATION OF WRITER OFFSET USING MEDIA DIMENSIONAL STABILITY

BACKGROUND

The present invention relates to data storage systems, and more particularly, this invention relates to managing dimensional stability issues.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

Tape drives write and read multiple data tracks simultaneously. It is critical that all data tracks are written in the correct locations for proper operation during subsequent readback. If the dimension of the head changes due to temperature or other causes, or if the transducers on the head are not positioned in the proper, design-specified locations due to fabrication variations, then data tracks will be written/read at incorrect locations. Likewise, if the media is not consistent in its dimensions, then the data tracks will move after writing and not be in the same location when the tape is read. In either case, successful read back of the data will be impaired.

In the past, the management of dimensional stability issues was done by tolerance control. Each component had limits on how much variation from design parameters was allowed. As track density increased, the allowable limits for variation were also decreased. However, to continue to increase track density to support high tape cartridge capacities, this method is no longer feasible, as components cannot be made at lower variation. Accordingly, the capacity growth of future tape storage schemes will be limited if new techniques for managing head and media dimensional stability are not developed.

SUMMARY

In one embodiment, a method includes writing, using a magnetic head, a set of parallel shingled tracks onto a magnetic recording tape using specified drive parameters, changing one of the specified drive parameters, reading a set of selected data tracks on the magnetic recording tape using the changed drive parameter, changing a lateral head position while reading the set of selected data tracks using the changed drive parameter, comparing track error rates observed during reading at the different lateral head positions, selecting a reader offset value based on the comparing, and performing a further action using the selected reader offset value.

In another embodiment, an apparatus includes a drive mechanism for passing a magnetic recording tape over a magnetic head, and a controller electrically coupled to the magnetic head. The controller is configured to write, using the magnetic head, a set of parallel shingled tracks onto the magnetic recording tape using specified drive parameters, change one of the specified drive parameters, read a set of selected data tracks on the magnetic recording tape using the changed drive parameter, change a lateral head position while reading the set of selected data tracks using the changed drive parameter, compare track error rates observed during reading at the different lateral head positions, select a reader offset value based on the comparing, and perform a further action using the selected reader offset value.

In yet another embodiment, a computer program product for calibrating a tape drive includes a computer readable storage medium having program instructions embodied therewith. The program instructions are executable by the tape drive to cause the tape drive to write a set of parallel shingled tracks onto a magnetic recording tape using specified drive parameters, change one of the specified drive parameters, read a set of selected data tracks on the magnetic recording tape using the changed drive parameter, change a lateral head position while reading the set of selected data tracks using the changed drive parameter, compare, by the tape drive, track error rates observed during reading at the different lateral head positions, select a reader offset value based on the comparing, and perform, by the tape drive, a further action using the selected reader offset value.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1A:
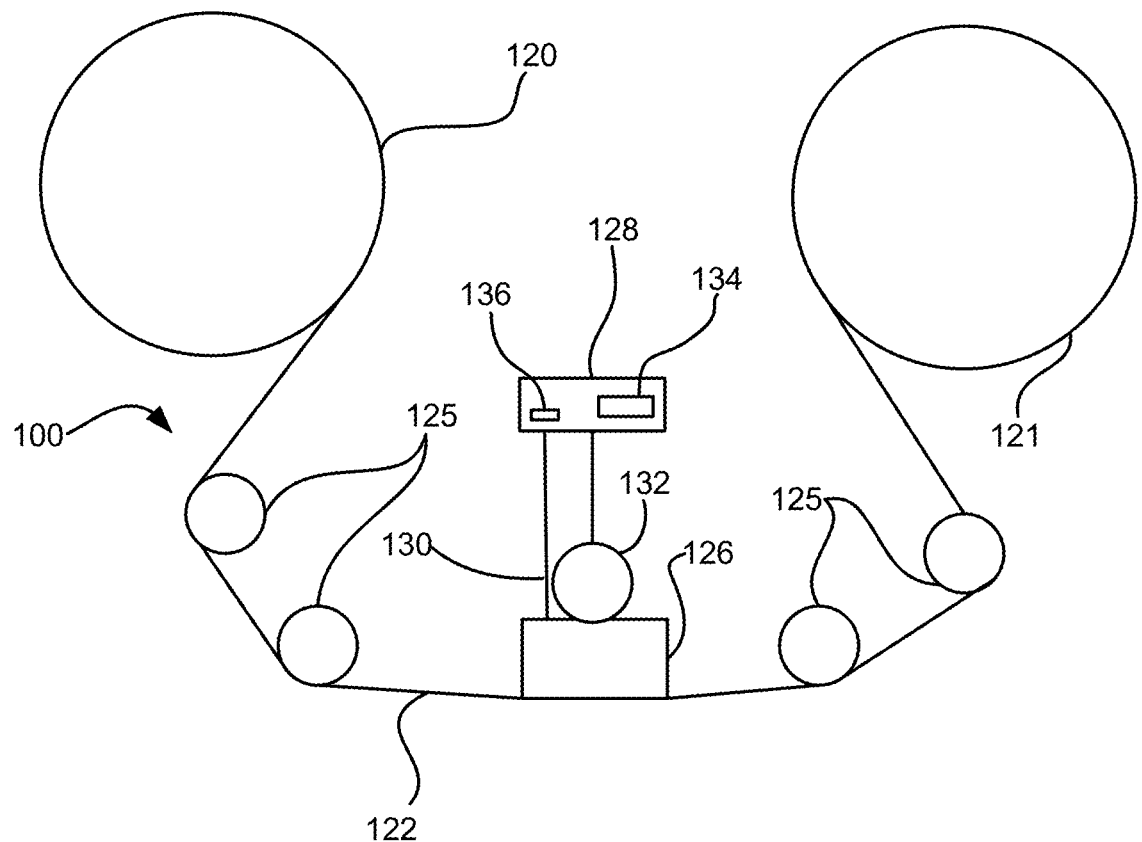
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a method includes writing, using a magnetic head, a set of parallel shingled tracks onto a magnetic recording tape using specified drive parameters, changing one of the specified drive parameters, reading a set of selected data tracks on the magnetic recording tape using the changed drive parameter, changing a lateral head position while reading the set of selected data tracks using the changed drive parameter, comparing track error rates observed during reading at the different lateral head positions, selecting a reader offset value based on the comparing, and performing a further action using the selected reader offset value.

In another general embodiment, an apparatus includes a drive mechanism for passing a magnetic recording tape over a magnetic head, and a controller electrically coupled to the magnetic head. The controller is configured to write, using the magnetic head, a set of parallel shingled tracks onto the magnetic recording tape using specified drive parameters, change one of the specified drive parameters, read a set of selected data tracks on the magnetic recording tape using the changed drive parameter, change a lateral head position while reading the set of selected data tracks using the changed drive parameter, compare track error rates observed during reading at the different lateral head positions, select a reader offset value based on the comparing, and perform a further action using the selected reader offset value.

In yet another general embodiment, a computer program product for calibrating a tape drive includes a computer readable storage medium having program instructions embodied therewith. The program instructions are executable by the tape drive to cause the tape drive to write a set of parallel shingled tracks onto a magnetic recording tape using specified drive parameters, change one of the specified drive parameters, read a set of selected data tracks on the magnetic recording tape using the changed drive parameter, change a lateral head position while reading the set of selected data tracks using the changed drive parameter, compare, by the tape drive, track error rates observed during reading at the different lateral head positions, select a reader offset value based on the comparing, and perform, by the tape drive, a further action using the selected reader offset value.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
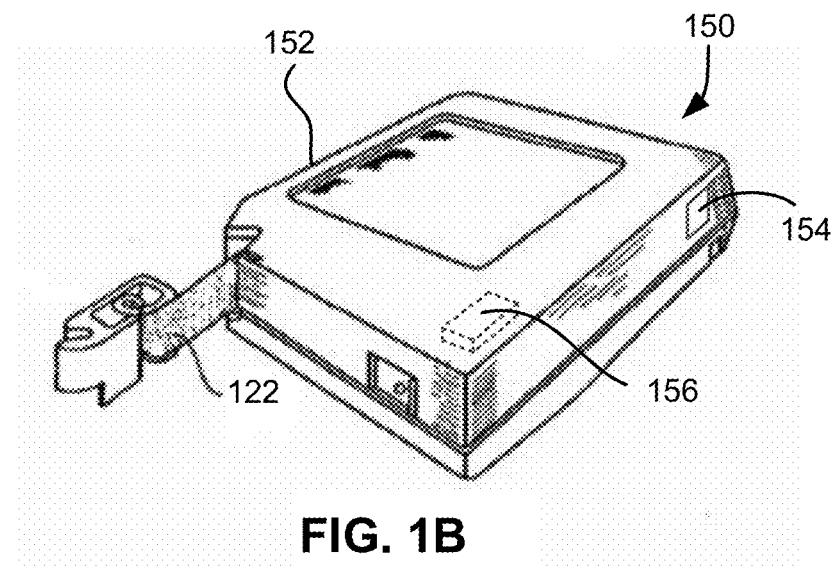
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
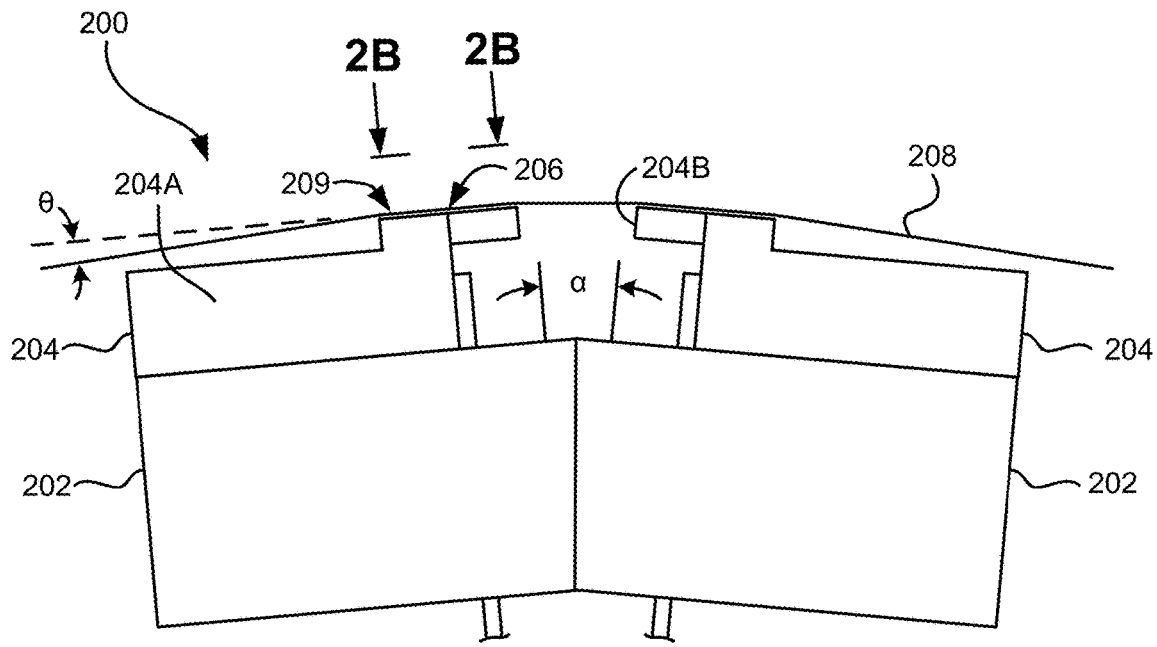
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
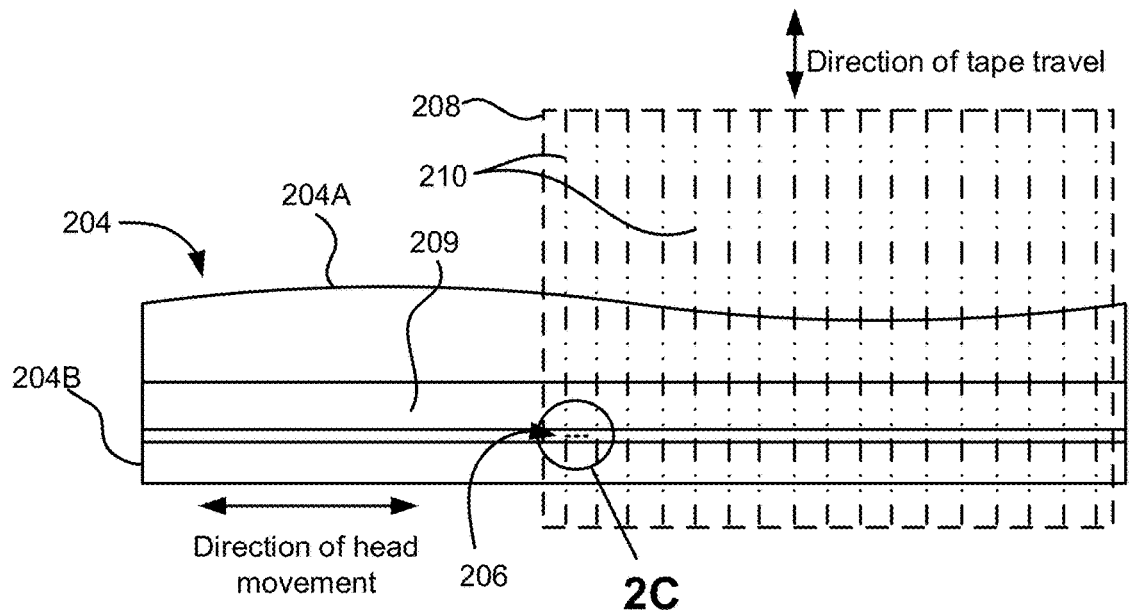
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
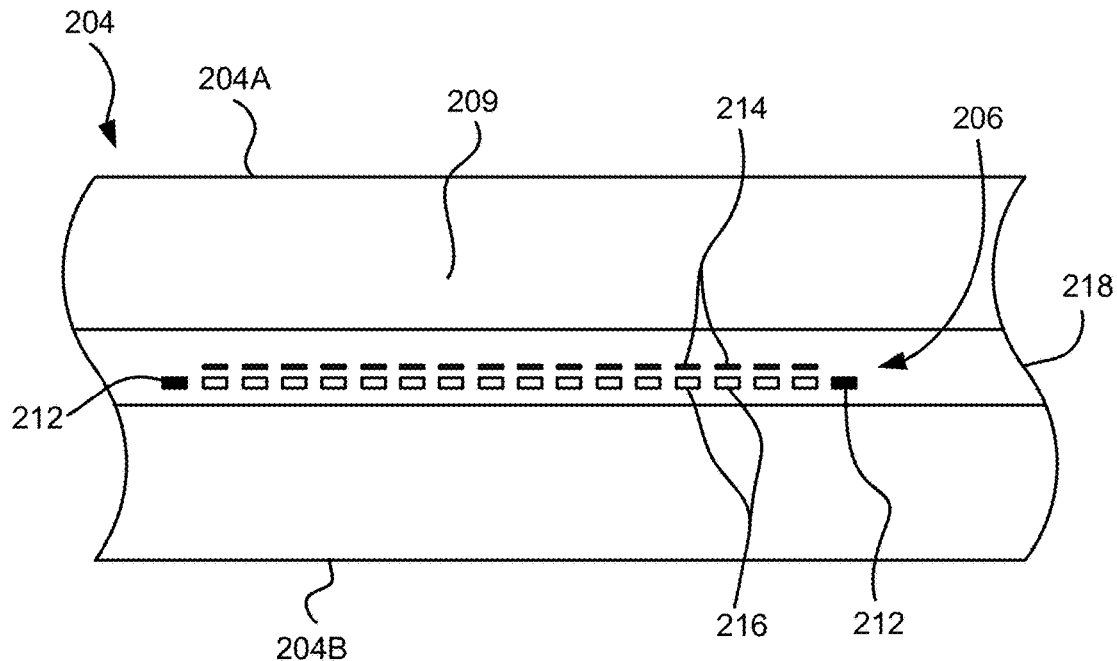
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
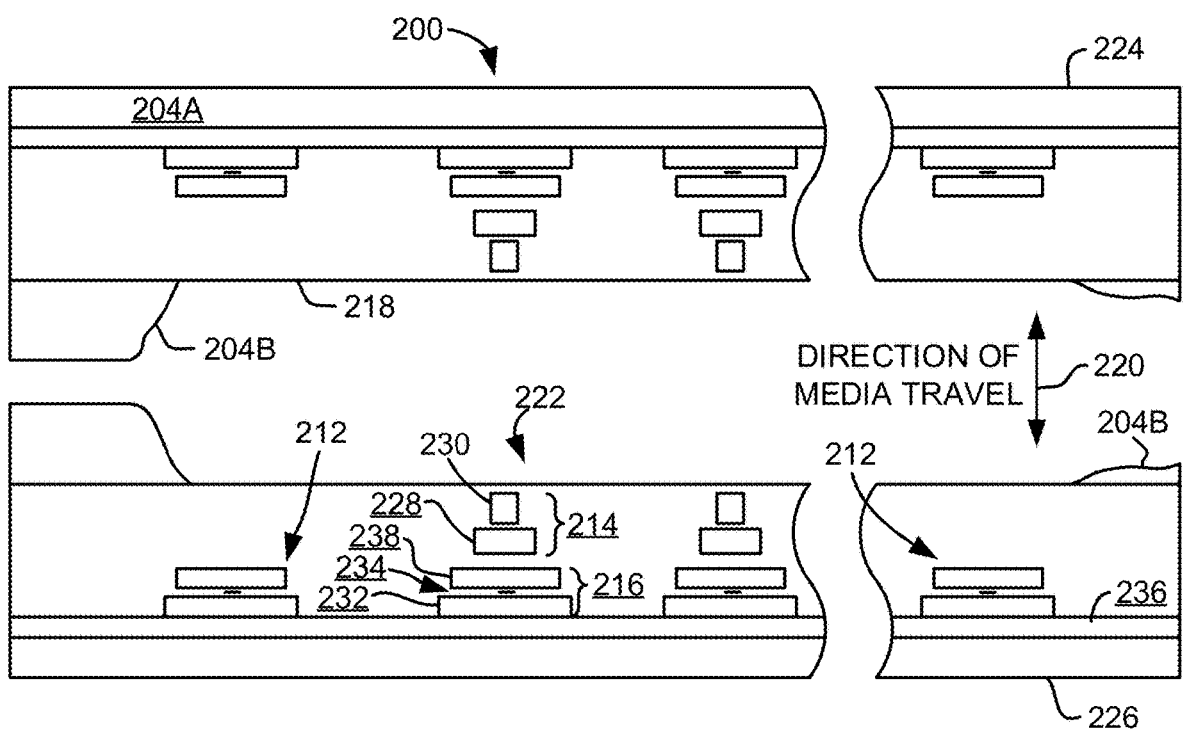
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
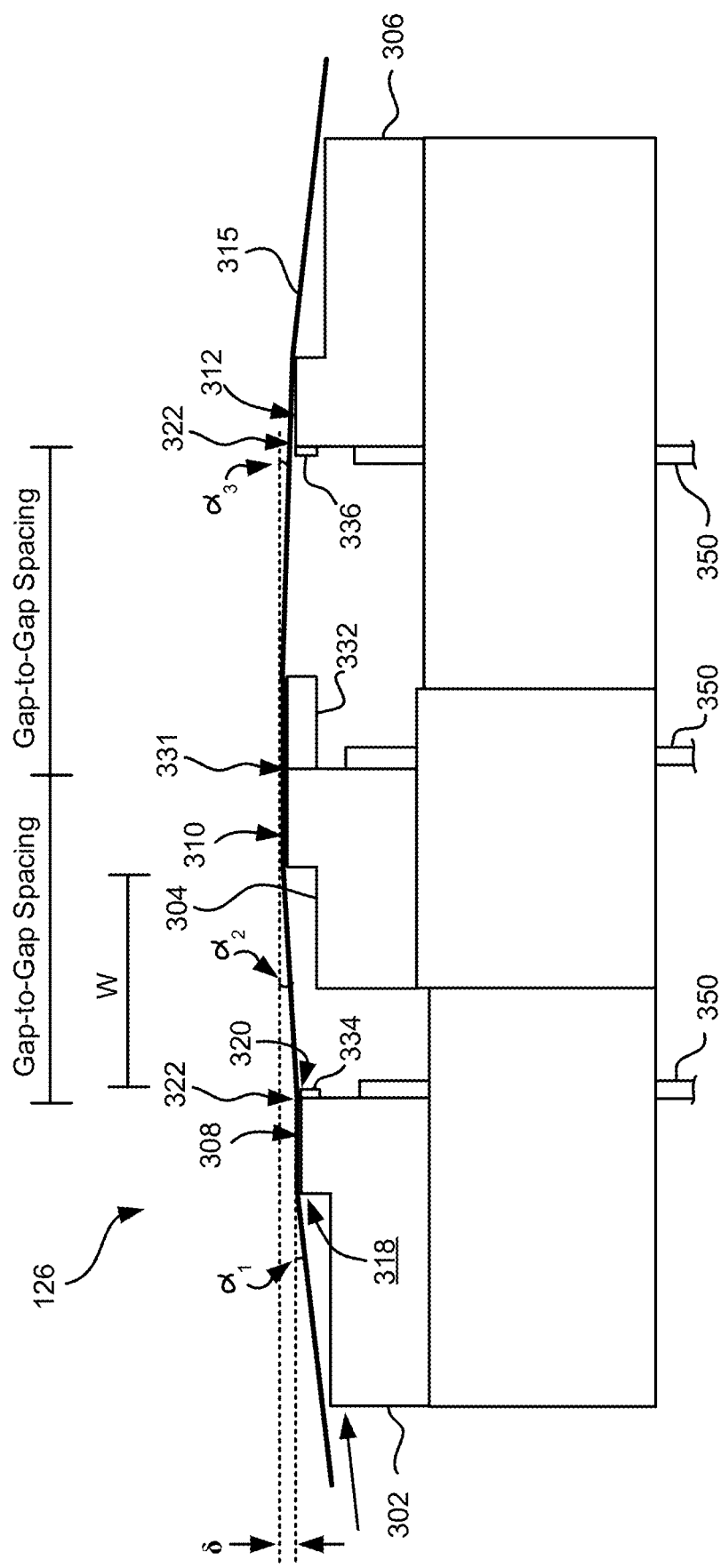
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
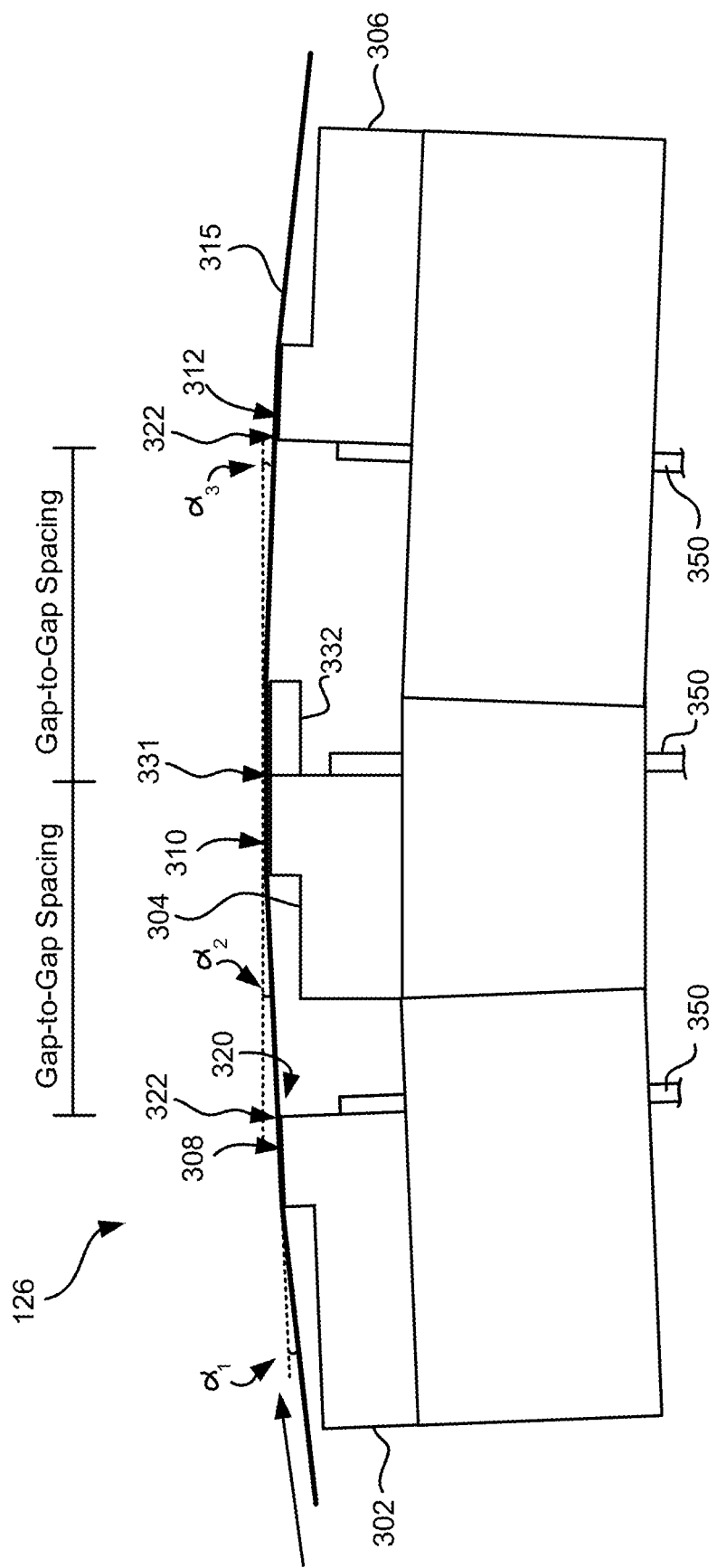
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
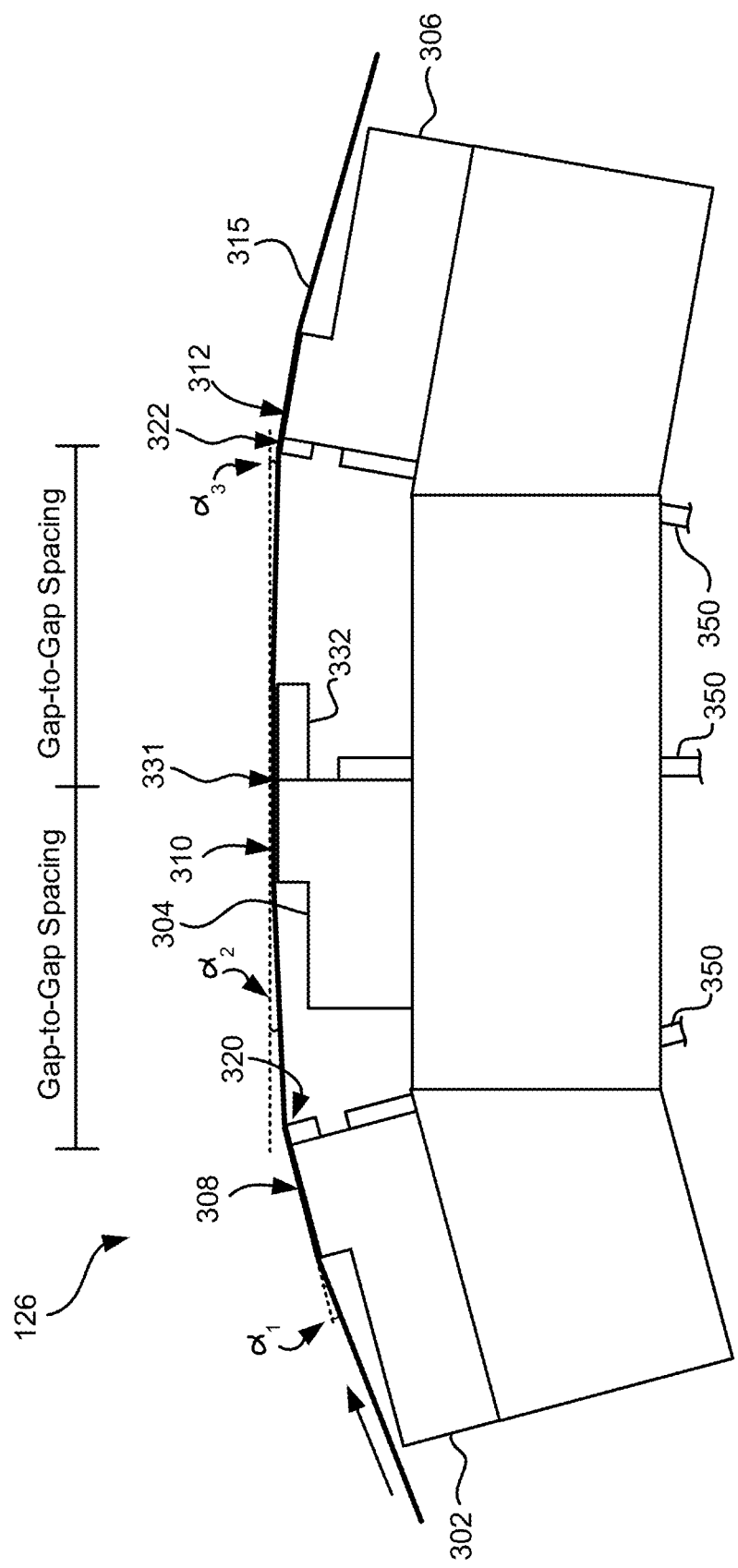
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
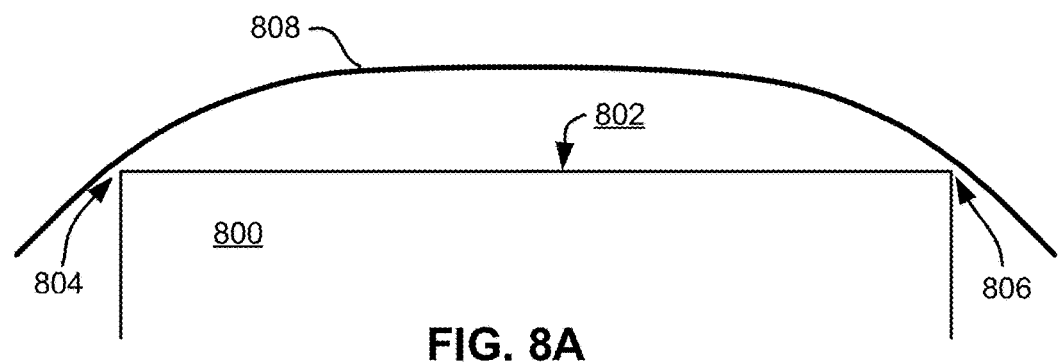
FIGS. 8A-8C are schematics depicting the principles of tape tenting.
Figure 8B:
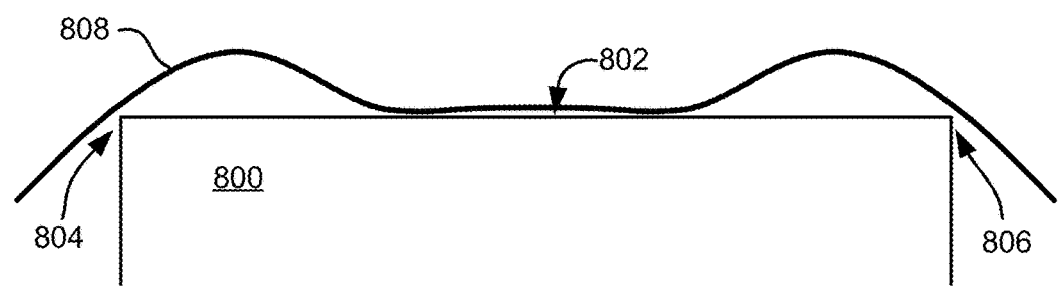
Figure 8C:
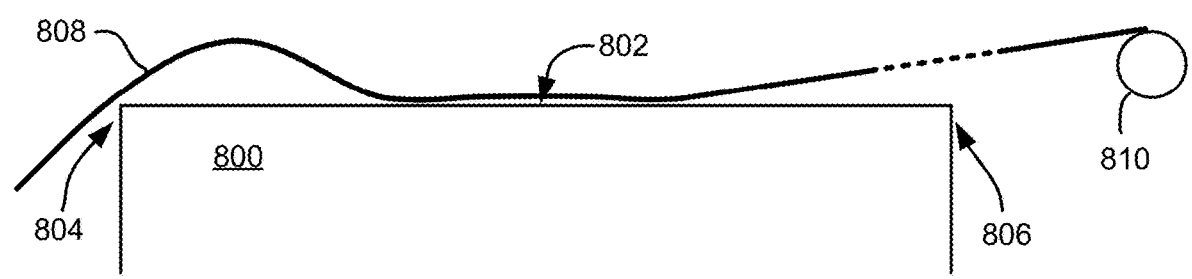

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
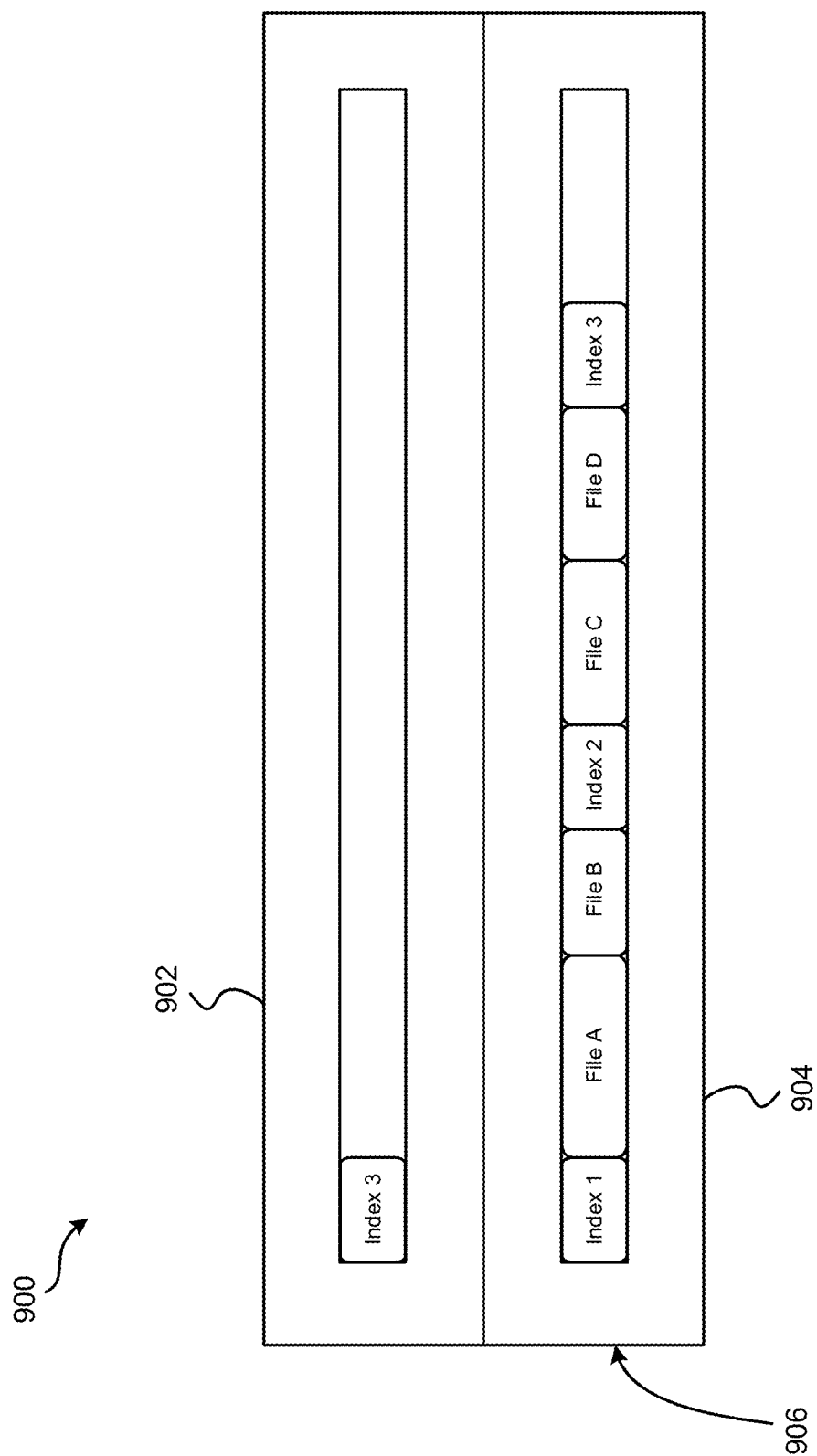
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As track density increases, resolution of dimensional stability issues becomes more important, and tolerance control is reaching the limit of its effectiveness. Particularly, there is a limit to the precision at which components can be fabricated. As dimensions of components become smaller and smaller, that limit will be reached.

As mentioned above, in tape storage, the magnetic head dimensions are not only different from drive to drive, but each head may also change over time due to factors such as thermal expansion, relaxation of stresses within the head, etc. Moreover, tape lateral contraction and expansion is a well-known phenomenon that occurs due to a plethora of effects, including absorption of water, thermal expansion and contraction, etc.

More permanent changes in media lateral dimensions may also occur, such as long-term media creep (also known in the art as "aging"), which tends to occur over time when a tape is wound around a hub of a tape cartridge. Long-term media creep is particularly problematic when dealing with tape dimensional stability issues, as the two ends of the tape exhibit creep in different ways. The inner wraps of tape positioned closest to the cartridge hub tend to expand laterally over time due to the compressive stresses exerted thereon by the wraps of tape wound around them. Wraps positioned toward the outer diameter of the spool of tape are under less compressive stress, but are under higher tensile stresses, which tends to cause lateral contraction of the tape, i.e., the tape becomes narrower over time. Accordingly, the ends of the tape exhibit oppositely-oriented lateral dimensional changes.

When the dimensions of the tape, the head, or both change, various issues arise. During writing, the likelihood of overwriting shingled tracks increases. Overwritten data is often unrecoverable. Likewise, during readback, if readers are no longer over the tracks to be read, reading errors increase.

Figure 10:
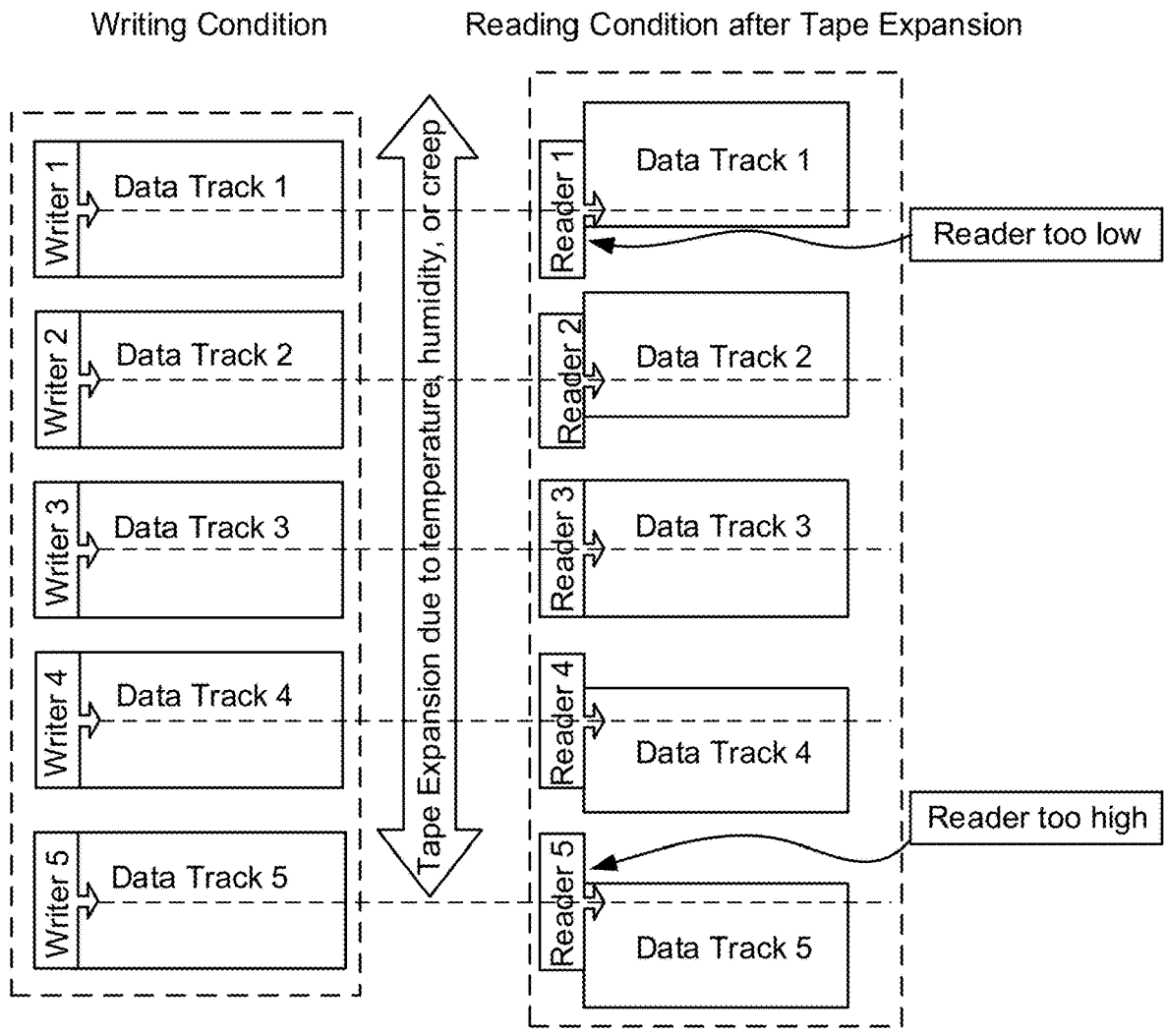
FIG. 10 is a representational diagram of the effect of tape lateral expansion and consequential transducer misregistration.
Figure 11:
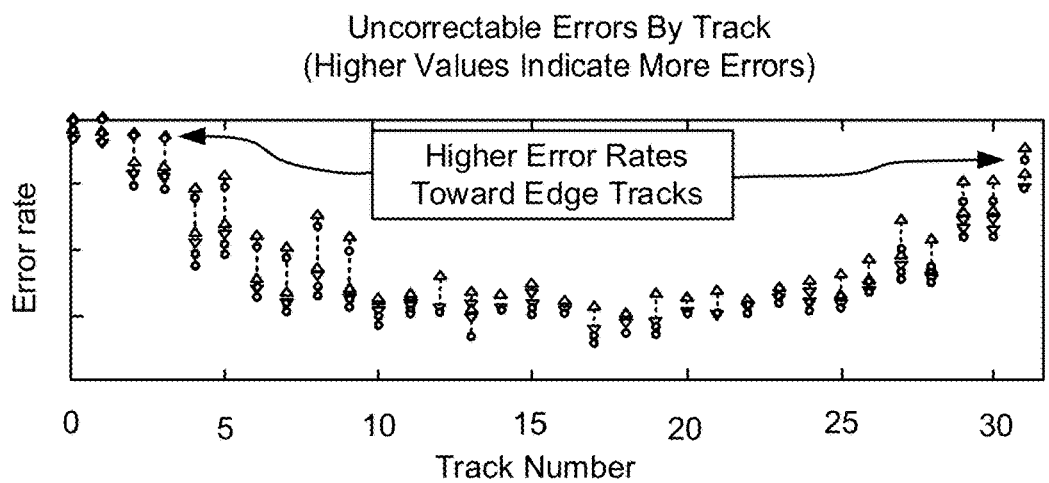
FIG. 11 is a chart exemplifying the increase in error rate toward outer ends of a reader array due to a misregistration of the readers toward the outer ends of the array.

FIG. 10 depicts the effect of a change in dimension of a head and/or tape after writing has occurred. For simplicity, five data tracks are shown, labeled Data Track 1 through Data Track 5. As shown, the data tracks are written at a certain spacing, referred to as the writing condition. However, sometime after writing, the tape has expanded due to factors such as temperature, humidity, creep, etc. Assume the readers have the same spacing (pitch) as the writers that wrote the data tracks. The track following system centers the middle reader on the middle track, but the outer readers are then partially off track due to the expanded condition of the tape. Accordingly, not only are the outer readers less influenced by the magnetic transitions of the outer data tracks, but shingled tracks adjacent the intended tracks influence the readers, creating noise. Thus, the misregistration results in a higher amount of read errors for tracks positioned toward the ends of the array. FIG. 11 is a chart exemplifying the increase in error rates toward outer ends of a reader array due to a misregistration of the readers toward the outer ends of the array. There is no position that the head may move to that will improve readback.

Similarly, if the magnetic head expands or contracts, or if due to head manufacturing tolerances the writer head and reader head have different spacing, similar misregistration can occur, even if the tape has not changed. Where both the tape and reading head have changed in opposite dimensions, e.g., one is contracted while the other is expanded, the misregistration problem is compounded. Thus, in either case the readback of that data is impaired.

In order to overcome the limitations mentioned above, new techniques to manage the stability of head and/or media are needed. Various techniques and approaches for managing head and media dimensional stability are presented herein.

Referring again to FIGS. 2A-4, typical tape drives have multiple modules, and at least two servo readers on each module. These servo readers and track following module of the controller decode respective servo patterns and assist in positioning the data transducers at the appropriate locations for reading and/or writing. In an ideal situation, the track following module would indicate that both servo readers are reading the same position on their respective servo tracks. However, this is rarely the case, for the many reasons enumerated above.

Fortunately, changes in dimensions of the head, the media, or both can be detected by comparing the difference in the servo reader measurements. This measurement from the servo readers is one method that can be used to determine variations in heads and media, and will be referred to herein as Servo Band Difference (SBD). SBD information may include the SBD measurement itself and/or information derived from the SBD measurements.

To measure SBD, servo readers on the same module read respective servo patterns on the media. In the ideal case, both servo readers would measure the same position on their relative servo pattern. However, media and heads are rarely ideal, and therefore any deviation from this ideal case can be determined by comparing the position measurements from the two servo channels. If SBD gets larger, this implies that the tape has contracted in the lateral direction and/or that the head has expanded. Likewise, if SBD gets smaller, this implies that the tape has expanded in the lateral direction and/or that the head has contracted.

Figure 12:
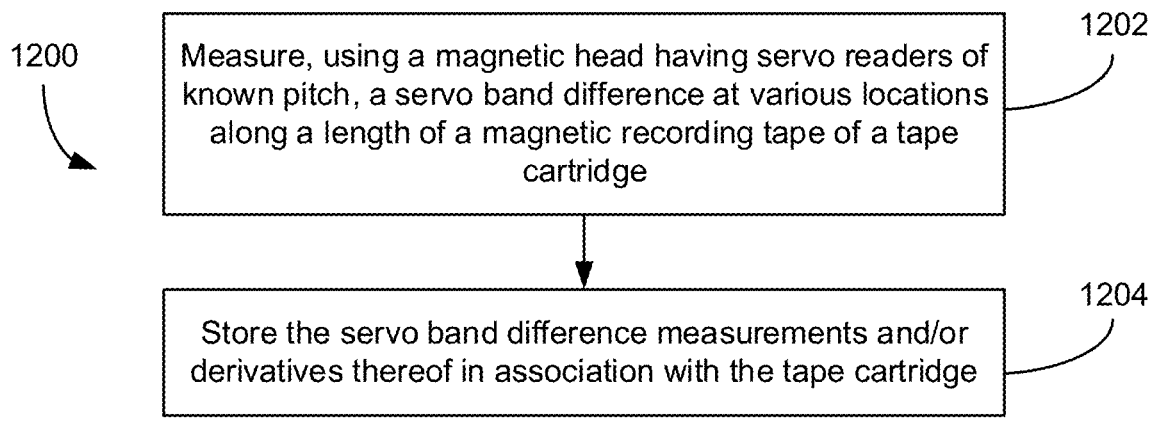
FIG. 12 is a flow chart of a process for characterizing a magnetic recording tape of a tape cartridge.

The SBD measurements may be used to characterize a magnetic recording tape. Referring to FIG. 12, a flowchart of a method 1200 for characterizing a magnetic recording tape of a tape cartridge is shown. The method 1200 may be performed in accordance with the present invention in any of the environments depicted in FIGS. 1-9, among others, in various approaches. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

This process may be performed when a new tape is being prepared for first use. For example, this process may be added to a conventional cartridge initialization process. This process may also be performed when a data band or data bands on a used tape is ready for overwriting.

As shown in FIG. 12, method 1200 may initiate with operation 1202, where SBD measurements are made at various locations along a length of a magnetic recording tape using a magnetic head having servo readers of known pitch. Because the spacing is not generally constant along the length of the tape, the observed SBD measurements are typically different as the tape move from beginning of tape (BOT) toward end of tape (EOT). Without wishing to be bound by any theory, it is believed that this change is due at least in part to the pack stresses that are imputed in tape when stored in the cartridge. SBD measurements may be taken for some, and preferably for each of the data bands on the tape. Preferably, the SBD measurements are taken at various locations along about an entire length of the magnetic recording tape, but, in some approaches, only a portion of the length of the tape is characterized. The tape is ideally maintained at about constant tension while measuring the SBD to minimize tension-induced dimensional changes of the tape. The constant tension is preferably similar to the preferred tension for read and/or write operations on the magnetic tape.

In one approach, while holding the tape tension about fixed, the tape drive moves the tape from BOT to EOT while making measurements of SBD. Since the SBD tends to change from BOT to EOT, multiple measurements are preferably made. In general, any granularity of measurement interval can be applied, with higher numbers of SBD measurements providing more information for later use. Preferably, at least 100 SBD measurements are taken between BOT and EOT for each data band, and more preferably at least 200 SBD measurements are taken between BOT and EOT for each data band, though less than 100 measurements may be taken in some approaches.

Note that servo reader pitch varies from head to head, and therefore, the raw SBD measurements do not typically reflect the actual servo track spacing. Said another way, wider or narrower servo pitch on the head than the assumed pitch would cause an error in the measurement of the current media spacing value. Accordingly, during this process, the pitch of the servo readers on the head is preferably known, and used to adjust (compensate) the SBD values so that the SBD values more accurately reflect the actual media spacing characteristics. The pitch of the servo readers corresponds directly to the spacing of the servo readers relative to each other, and may be center-to-center pitch, edge-to-edge pitch, etc.

The pitch of the servo readers may be derived or obtained in any suitable known manner. Typically, this value is stored in the memory of each drive during manufacture thereof. In one approach, the pitch is measured for each drive at manufacturing and placed in a non-volatile area of drive memory such as with the vital product data (VPD). This head calibration can be performed in multiple ways, such as measurement with an atomic force microscope (AFM) using stages, the use of a reference tape having servo tracks of known spacing, or any other method which provides a measurement of transducers relative to other transducers. In another approach, the pitch is measured for a drive after the drive has been built, and optionally in use. In a preferred approach, a reference tape may be used.

By using the pitch value stored in the VPD, when a tape is characterized using process 1200, the measurements observed can be compensated according to the head spacing value stored in VPD, thus ensuring that the measurements taken, and corresponding values ultimately written to the cartridge memory (CM), are representative of the cartridge, and not unduly influenced by the head making the measurement.

Additionally, by using temperature and/or humidity sensors in the drive (or external sensors with information communicated to the drive), the effects of the local temperature and/or humidity can also be compensated for. For example, if the humidity is high, then tape expands and the cartridge is initialized at this high humidity condition. It is desired that the stored SBD values represent a nominal condition in head spacing, temperature, and humidity.

In operation 1204, the SBD measurements and/or derivatives thereof (collectively referred to herein as "SBD information") are stored in association with the tape cartridge. Preferably, the SBD information includes a position along the tape where each SBD measurement was taken, in association with the corresponding SBD measurement. For example, Linear Tape Open (LTO) linear positioning (LPOS) information may be stored in association with each SBD measurement. Accordingly, a representation of the media spacing characteristics at the time of performing method 1200 is stored for later use.

Any of a plurality of storage techniques may be used to store SBD information, such as storage of raw points; fitting of the measurements to a function (linear, polynomial, spline, etc.) and then storing the coefficients or describing variables; etc. The SBD information can be stored in any suitable location where it can be referenced at a later time. The SBD information is preferably written to the CM of the cartridge. Other locations for storage of the SBD information include on the tape itself, e.g., in the header information; on a removable storage device of the cartridge, e.g., an SD card; in a database of information about tape cartridges, e.g., in a library database; in cloud-based storage; etc.

The method 1200 may be performed as part of a cartridge initialization procedure. For example, in addition to performing conventional special operations during the first load of a brand-new cartridge, the operations of method 1200 may be performed during the cartridge initialization process.

The method 1200 may also be invoked at times other than the first load. For example, the timing for performing method 1200 may correspond to other operations, such as changing the format of the tape, after a garbage collection process renders all data on the tape deleted, etc. Characterizing or recharacterizing the tape at times other than the first load may be useful to reset the SBD information to account for any creep that has occurred in the media since the previous initialization. Other operations, such as those that are completely destructive, such as the format command, may be considered as appropriate times to reissue the cartridge initialization.

Figure 13:
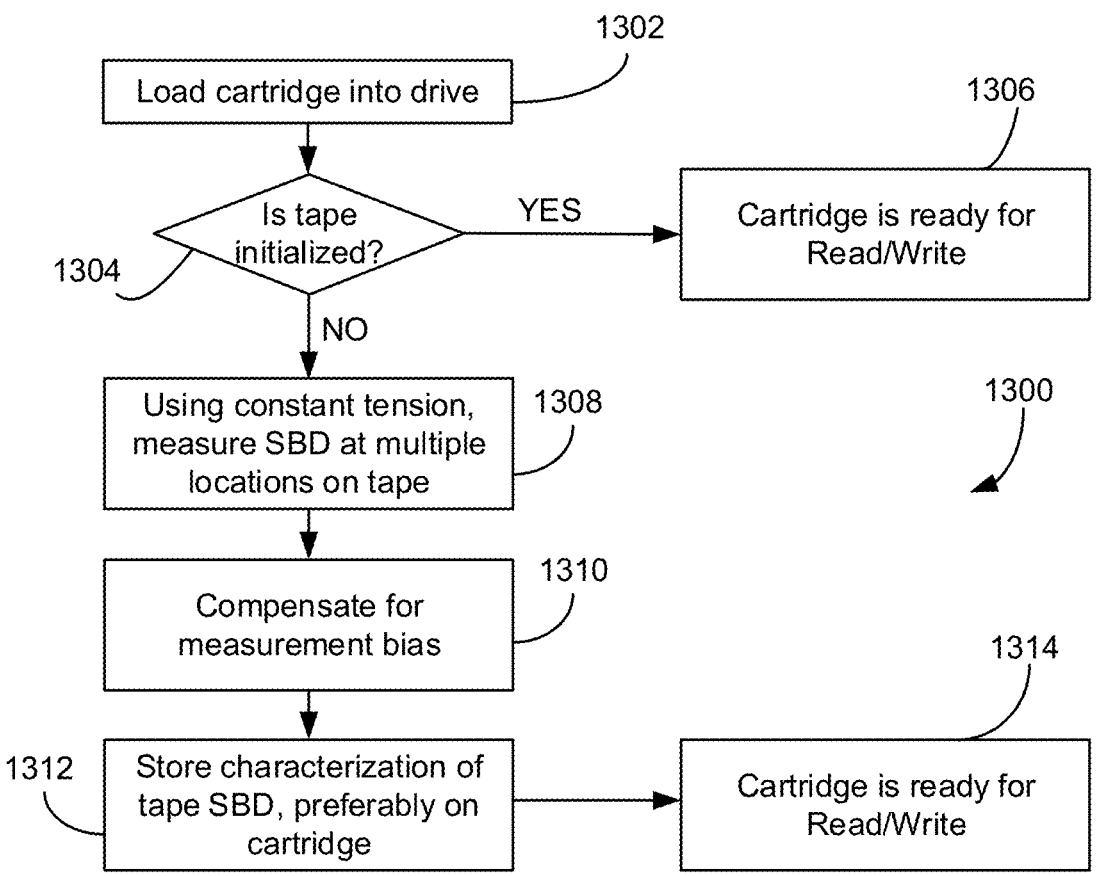
FIG. 13 is a flowchart of a process for characterizing a magnetic recording tape of a tape cartridge in one illustrative approach.

FIG. 13 is a flowchart of a method 1300 for characterizing a magnetic recording tape of a tape cartridge in one illustrative approach. The method 1300 may be performed in accordance with the present invention in any of the environments depicted in FIGS. 1-12, among others, in various approaches. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 13, method 1300 may initiate with operation 1302, where a cartridge is loaded into a tape drive. At decision 1304, a determination is made as to whether the tape has been initialized, e.g., using the method 1200 of FIG. 12, and SBD information is available for the tape. If so, the cartridge is deemed ready for read and/or write operations. See operation 1306. If SBD information is not available, the method 1300 proceeds with operation 1308 where the SBD is measured at multiple locations of the tape using about constant tension. In operation 1310, the measurements are compensated for any of a variety of parameters. For example, the measurements may be compensated due to measurement bias from the head dimensions, and namely the servo reader pitch. The compensation may also and/or alternatively have a temperature and/or humidity component. In operation 1312, the SBD information is stored, preferably in the CM of the cartridge, but may be in other locations such as on the media itself, in a removable memory coupled to the cartridge such as an SD card, etc. The cartridge is deemed ready for read and/or write operations. See operation 1314.

Figure 14:
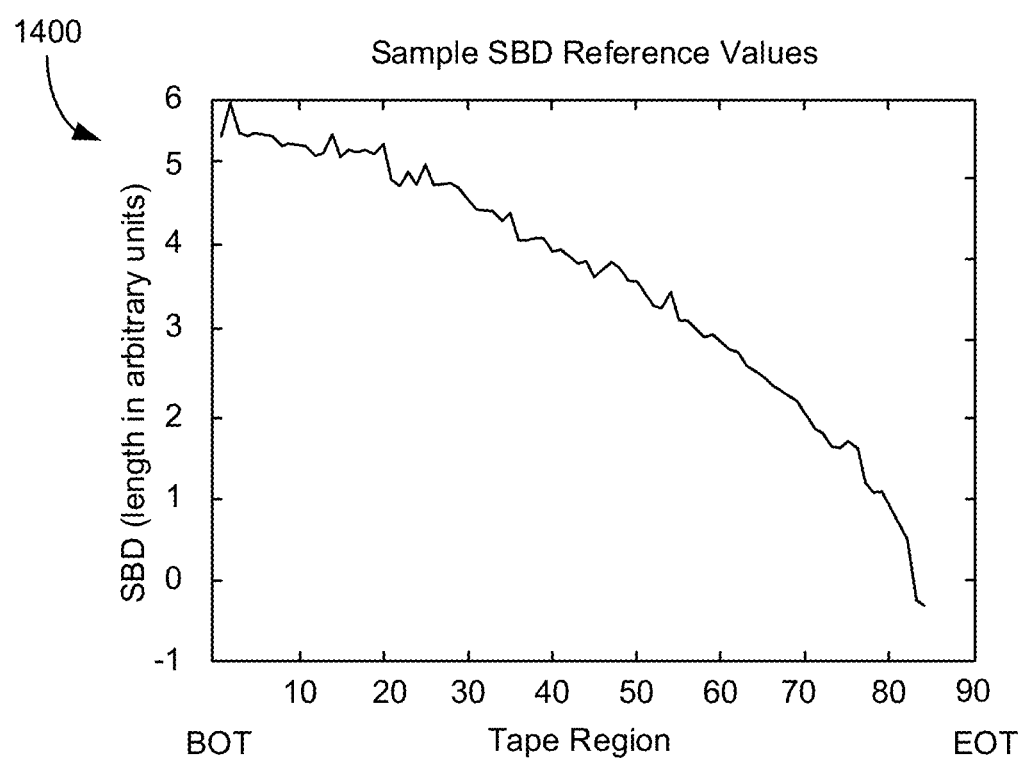
FIG. 14 illustrates exemplary sample Servo Band Difference (SBD) reference values from Beginning of Tape (BOT) to End of Tape (EOT) gathered during performance of the process of FIG. 12.

FIG. 14 is a chart 1400 that illustrates exemplary sample SBD reference values from BOT to EOT gathered during performance of the method 1200 of FIG. 12. As shown, the SBD measurements are highest at BOT and turn slightly negative by EOT. As noted above, where SBD is larger, this implies that the tape has contracted in the lateral direction in the time since the servo tracks were written. Likewise, where SBD gets smaller, this implies that the tape has expanded in the lateral direction.

The SBD information stored in association with the tape and its cartridge can then be used for other things, such as reading and writing.

During writing, the stored SBD information may be retrieved, e.g., from the CM, and loaded into the drive memory for use as reference values for the desired SBD for the current writing operation. Because most tape formats utilize shingling, the current tracks partially overwrite previously written tracks. The amount of shingling must be precisely controlled, or else too much of the previous track will be overwritten, and the data written to those previous tracks will become unreadable and the data irretrievably lost. As tape and head dimensional changes affect the location of written tracks, it is critical that the current writing operation does not excessively trim, or narrow, the previously written data.

As mentioned above, written tracks have an ideal characteristic of straight and uniform edges. However, actual writers leave tracks that have distortions and other defects along the edges of the track. These distortions may be different on one edge of the track relative to the other as a result of the shingling process used to write data on the tape.

The consequences of the tracks having imperfections is that the reader, whose nominal location should be in the center of the ideal track, may not be centered in the actual residual track due in part to the track's distortions. If the reader is not centered in the track, then error rates tend to increase and resulting in suboptimal drive performance. The nature of these distortions is that each individual writer has unique characteristics, and so changing the fixed offset of all writers may not compensate for the distortions of a few individual writers. Moreover, since the distortions originate from the writers, it would be desirable to shift the writing location such that the actual written track is as close as possible to the nominal location for the readers so that each reader will be centered as well as possible on the track.

Figure 15A:
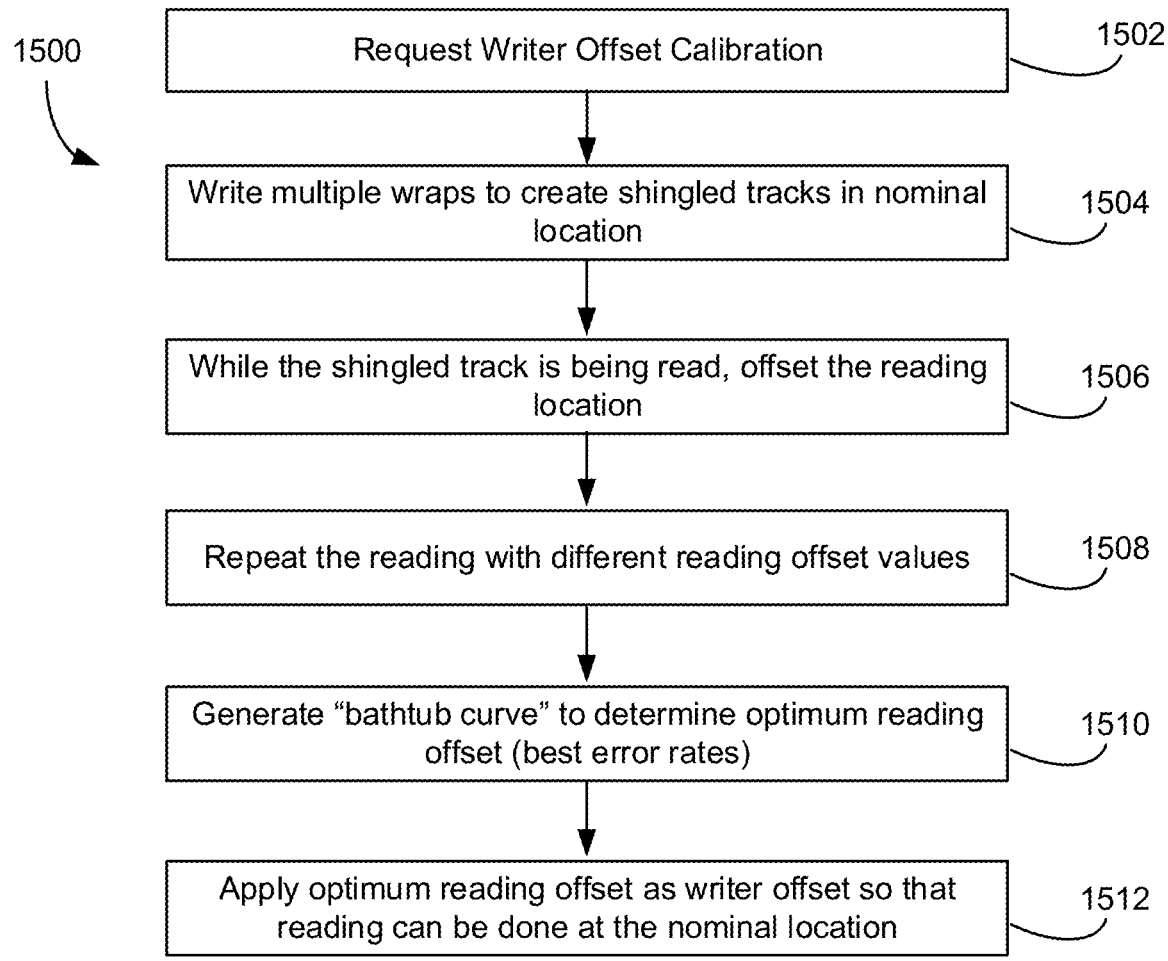
FIG. 15A is a flowchart of a process for calibrating writer offset of a tape drive.

One method for calculating a writer offset value to lower reader error rates includes performing a calibration procedure. FIG. 15A is a flowchart of a method 1500 for a calibration procedure for calculating the writer offset. The method 1500 may be carried out with various embodiments described herein, or the method may be carried out in other processes. Each of the steps of the method 1500 may be performed by any suitable component of the operating environment. For example, in various embodiments, the method 1500 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

The method 1500 may be performed in response to receiving a request to write to a tape of a tape cartridge. Conventional operations are typically performed in addition to the steps below, including loading the tape in the tape drive, mounting the tape, spooling the tape to the proper location for writing, processing index information about the data on the tape, etc.

The calibration procedure as described in method 1500 includes the drive writing a shingled track and then reading at many different locations. Operation 1502 includes the drive requesting a writer offset calibration. In operation 1504, multiple wraps are written to create shingled tracks in nominal location.

In operation 1506, while the shingled track is being read, reading location is offset. Each reading location is offset by the same set unit interval. Operation 1508 includes repeating the reading with different reading offset values. Thus, the written shingled track may be read at many different locations, in known reader offset intervals (e.g., 1 unit, 2 units, 3 units, etc.), and generating error values at each location at each known interval. The units of reader offset may be arbitrary to the system in use.

Figure 15B:
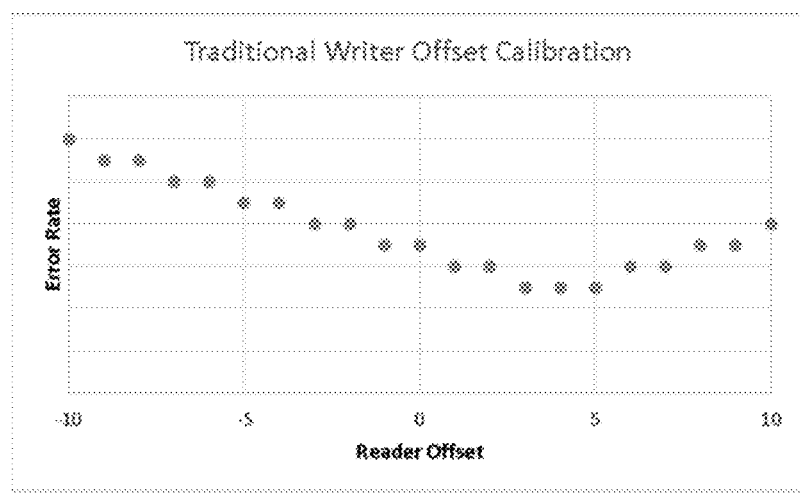
FIG. 15B is a chart exemplifying a "bathtub curve" of a writer offset calibration.

In operation 1510, the drive generates a "bathtub curve" as shown in FIG. 15B to determine optimum reading offset (e.g., best error rates). The locations with the best error rates will have the lowest error rates, and thus the reading offset value that provides a location with the lowest error rate (e.g., having neighboring locations with higher error rates) will be designated as the optimum reading offset. As shown in FIG. 15B, the best reading offset is at +4, the location of the reader that generates the lowers error rate (e.g., the relative minimum of the bathtub curve).

In operation 1512, the drive applies the optimum reading offset as writer offset so that reading can be done at the nominal location. The writer offset in terms of the optimal reading offset is an adjustment in the opposite direction. For example, as shown in FIG. 15B, the best reading offset is determined to be +4 thereby indicating that the writer is writing +4 units above the original nominal place, thus, the writer is offset by −4 so that writer is now writing in a nominal location for the reader.

When the drive employs method 1500, during step 1506, an initial reading and measurement of error rates are accomplished. However, at this point, the best error rate of these measured error rates cannot be determined. Moreover, these measured error rates do not indicate the direction of offset that would provide the optimum error rate. Therefore, in order to determine the optimal error rate and direction of offset, step 1508 is exhaustively repeated multiple times to check all potential offsets, and then each of these results are examined to determine the offset that may generate the best error rate. Thus, method 1500 relies on an exhaustive search with multiple reading operations in order to determine a direction and magnitude of optimum offset.

After the exhaustive search, method 1500 may determine a nominal location of an element having neighboring elements with higher error rates and from this finding, a midpoint of the offset may be calculated as the best reader offset. The amount of reader offset is then negated and assigned to the writer for the offset values that would have produced a track such that the reader would be centered in the nominal location. Although this method has been useful for existing track density, more recent systems having increasing track density need a more accurate determination of the track center.

As discussed previously, and shown in FIG. 10, tape dimensional (in)stability (TDS) is a conditions of tape heads and media to retain their shape/size when subjected to varying conditions that affect the dimensions of the tape heads and media, for example, different temperatures, humidity, tape tension, etc. In one example of tape tension, as tape tension increases on a tape, the tape becomes elongated in the machine in a longitudinal (e.g., axial) direction, or becomes shortened in the lateral (e.g., transverse) direction by Poisson's ratio of Equation 1, where the media tends to expand in directions perpendicular to the direction of compression.

$$v = -\frac{d\varepsilon_{trans}}{d\varepsilon_{axial}} \quad \text{Equation 1}$$

where $v$ is the Poisson's ratio of the ratio of relative transverse strain ($\varepsilon_{trans}$, negative for axial tension or stretching, positive for axial compression) to relative axial strain ($\varepsilon_{axial}$, positive for axial tension, negative for axial compression).

In an ideal setting where there is a match between writing and reading conditions, all readers will be centered in their respective tracks. However, if there is a difference in TDS between writing and reading, then not all of the readers may be centered in their respective tracks. As discussed above, the amount of TDS can be measured by observing the servo band difference (SBD), the difference between position measurements from two servo channels. A larger SBD implies that the tape has contracted in the lateral direction and/or the head has expanded. And conversely, a smaller SBD implies that the tape has expanded in the lateral direction and/or that the head has contracted.

For example, a tape drive detecting an SBD may have a tracking location of the readers such that the center readers (tracks 16 & 17 of a 32 track device) are centered in their tracks, while the outer readers (tracks 1 and 32 on the 32 track device) are not centered. Track 1 is offset in one direction, while track 32 is offset in the opposite direction; and each offset will degrade the error rate performance of that particular reader (e.g., track 1 and track 32) to approximately the same extent. However, if the nominal reading location is not centered, then the center readers may not be centered in their respective tracks, and the edge readers will not have equal amounts of error rate degradation. Further, the edge reader with the greater error rate degradation may have error to an unreadable extent.

By way of example, FIG. 10, as previously discussed, depicts a simplified schematic diagram of 5 data tracks affected by TDS, tape expansion in this case. Ideally the center reader, in this case Reader 3, will be centered in its respective data track, in this case Data Track 3. Due to the tape expansion in this case, Data Track 1 and Data Track 5 are offset by the same amount but in opposite directions. Reader 1 is positioned too low to accurately read Data Track 1 and will generate elevated error rates Reader 5 is position too high to accurately read Data Track 5 and will generate elevated error rates, the error rates of Data Track 1 and Data Track 5 will be similar. Thus, the error rates generated from the diagram in FIG. 10 would be symmetrical across the readers.

Figure 16:
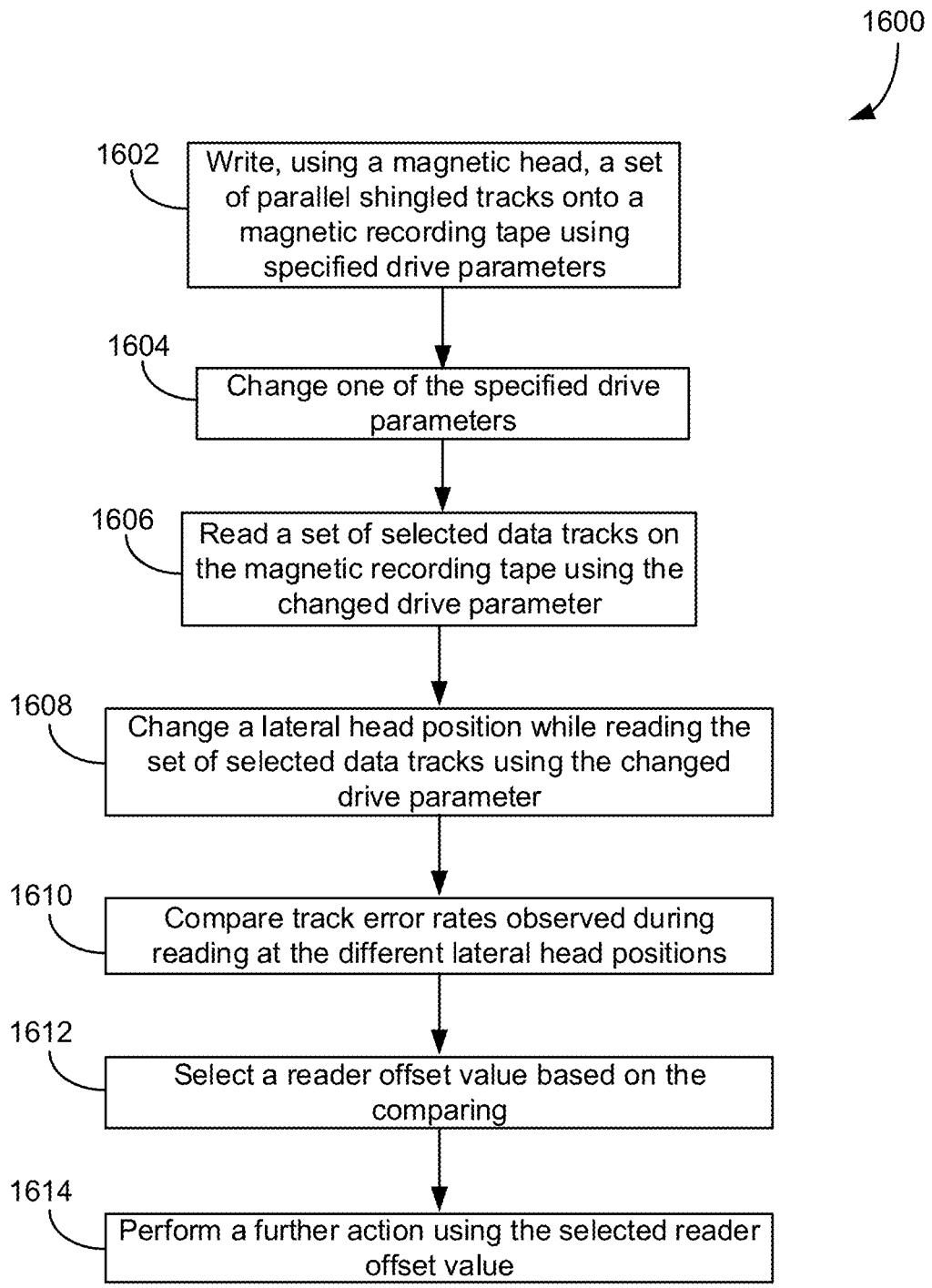
FIG. 16 is a flowchart of a process for calibrating a writer offset using media dimensional instability, according to one embodiment.

TDS with SBD measurements combined with the foregoing phenomenon of symmetrical error rates of readers/tracks may be applied to a process of calibrating the writer offset. Referring to FIG. 16 a flowchart of a method 1600 for calibrating a tape drive is shown, according to one embodiment. The method 1600 may be performed in accordance with the present invention in any of the environments depicted in FIGS. 1-15, among others, in various approaches. Of course, more or less operations than those specifically described in FIG. 16 may be included in method 1600, as would be understood by one of skill in the art upon reading the present descriptions.

Each of the steps of the method 1600 may be performed by any suitable component of the operating environment. For example, in various embodiments, the method 1600 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1600. Illustrative processors include, but are not limited to, a central processing unit (CPU), an application specific integrated circuit (ASIC), a field programmable gate array (FPGA), etc., combinations thereof, or any other suitable computing device known in the art.

This process may be performed when a new tape is being prepared for first use in a tape drive. For example, this process may be added to a conventional cartridge initialization process. This process may be performed when a tape drive is being calibrated for a first use. This process may also be performed when a data band or data bands on a used tape are ready for overwriting by a tape drive.

As shown in FIG. 16, method 1600 may initiate with operation 1602, where using a magnetic head, a set of parallel shingled tracks are written onto a magnetic recording tape using specified drive parameters. In some approaches, a set of shingled tracks may be written at a specific tension. In other approaches, a set of shingled tracks may be written with a specified SBD. The SBD values may be obtained as described above in method 1200 of FIG. 12.

Referring back to FIG. 16, operation 1604 of method 1600 includes changing one of the specified drive parameters. In various approaches, more than one of the drive parameters may be changed for the reading. In one approach, the changed drive parameter may be a tape tension setting. In another approach, the changed drive parameter may be anything that changes an SBD value, such as any of the following parameters.

In various approaches, a specified drive parameter may include an adjustment of an operating condition of the tape drive such as adjusting tape tension and/or heating or cooling the tape, adjusting pitches between transducers of the magnetic head e.g., by inducing thermal expansion of the head using an integrated heating device, inducing expansion or contraction of the head using a piezo device, etc.; tilting the axis of the array of transducers away from perpendicular to the direction of tape travel; etc.

Operation 1606 of method 1600 includes reading a set of selected data tracks on the magnetic recording tape using the changed drive parameter.

Operation 1608 includes changing a lateral head position while reading the set of selected data tracks using the changed drive parameter. In one approach, the change in lateral position is preferably performed in steps of known increment, thereby indexing each reader across the track it is reading. In another approach, the change in lateral position is performed as a continuous process.

Operation 1610 includes comparing track error rates observed during reading at the different lateral head positions. In one approach, the comparison may be of track error rates of only outermost readers of an array of readers used for the reading. The selected reader offset value may correspond to the lateral head position having track error rates of the outermost readers that are most similar to one another. In some approaches, the comparison may include using only the single outermost reader on each end of the array. In other approaches, the comparison may include using average error rates for sets of outermost readers, e.g., the 2-5 outermost readers on each end of the reader array.

Operation 1612 of method 1600 includes selecting a reader offset value based on the comparing. In one approach, the selected reader offset value may correspond to the lateral head position having the lowest observed track error rates.

Operation 1614 of method 1600 includes performing a further action using the selected reader offset value. In one approach, the further action may include calculating a writer offset value, and storing the writer offset value in memory. In another approach, the further action includes storing the reader offset value in memory.

Figure 17:
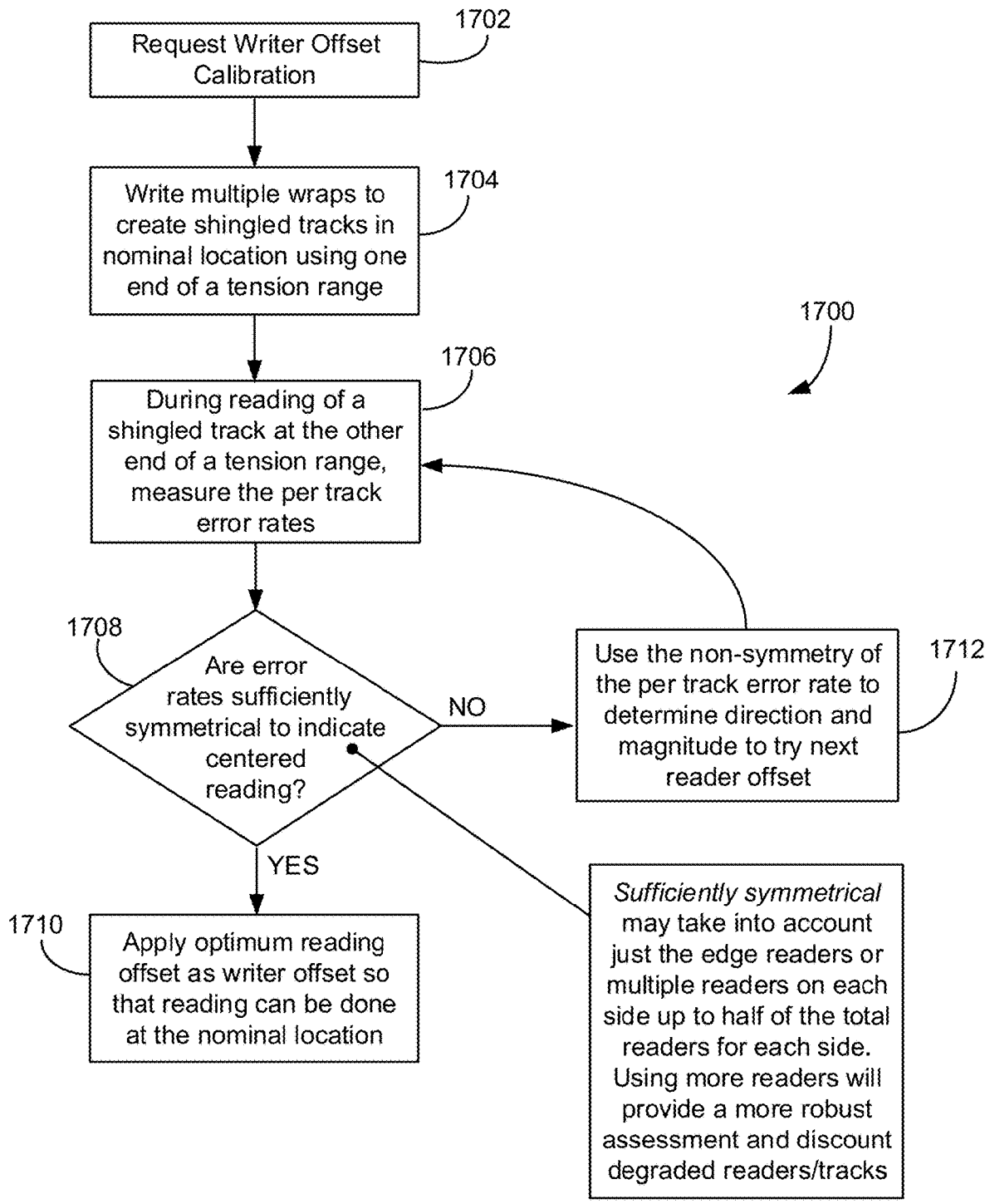
FIG. 17 is a flow chart of one exemplary mode of use for calibrating writer offset using media dimensional instability in one illustrative approach.

FIG. 17 is a flowchart of a method 1700 for one exemplary mode of use. The method 1700 may be performed in accordance with the present invention in any of the environments depicted in FIGS. 1-16, among others, in various approaches. Of course, more or less operations than those specifically described in FIG. 17 may be included in method 1700, as would be understood by one of skill in the art upon reading the present descriptions.

Each of the steps of the method 1700 may be performed by any suitable component of the operating environment. For example, in various embodiments, the method 1700 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1700. Illustrative processors include, but are not limited to, a central processing unit (CPU), an application specific integrated circuit (ASIC), a field programmable gate array (FPGA), etc., combinations thereof, or any other suitable computing device known in the art.

In operation 1702 of method 1700, a request is made to calibrate the writer offset. In response to the request, operation 1704 includes writing multiple wraps to create shingled tracks in nominal location using one end of a predefined tension range.

Operation 1706 includes measuring the per track error rates during reading of a shingled track at the other end of the predefined tension range. The tension change induces a TDS change such that the reading condition is different than the writing condition. The result of the TDS change is reflected in a change of error rates.

In one approach, during the writing process, a lower tension value may be applied, thereby allowing the TDS condition to affect the written tracks. Then for the reading process, the tension value is changed to a relatively higher value. Thus, a large TDS effect may provide a TDS signature in the per channel error rates to more accurately assess the symmetry of the error rates at each end of the array. Without wishing to be bound by any theory, it is believed that centering the readers in the data tracks using a TDS effect as described herein in method 1600 and 1700 more efficiently centers the readers compared to the method of writer offset as described in method 1500. Using a bathtub curve as in method 1500 to determine the lowest error rate of the readers may misidentify a location as centered. In some cases, the bathtub curve may identify a relative minimum error rate of a track/reader compared to the error rates of immediate neighboring tracks/readers, and thus this method does not have the ability to assess a larger range in one measurement.

Figure 18A:
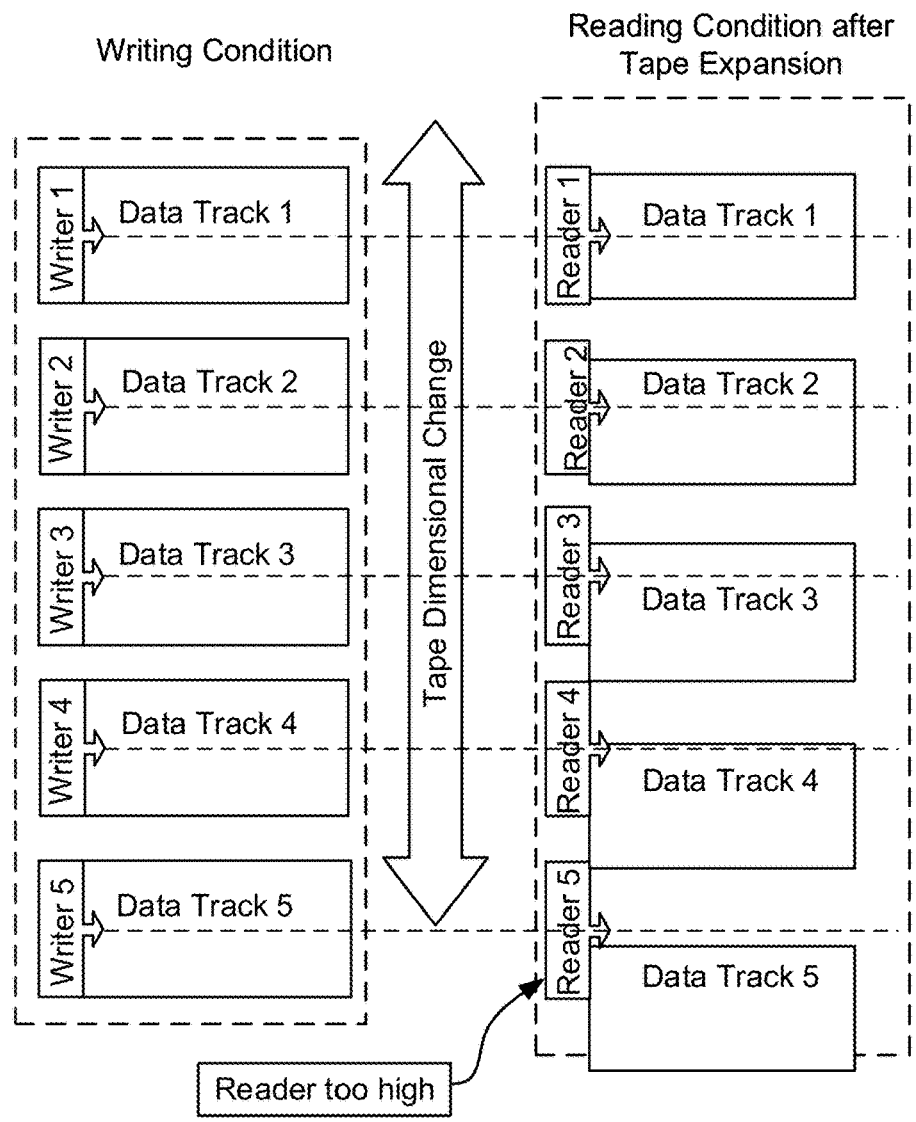
FIG. 18A is a representational diagram of the effect of tape dimensional change and consequential transducer misregistration.

While symmetrical error rates across the array of readers, it is more likely that the first reading operation will exhibit a skewed error rate across the array of readers, in large part due to the change in TDS induced by the different drive conditions applied during reading. FIGS. 18A-18B and FIGS. 19A-19B illustrate the effect of a TDS change on reader position relative to tracks written under different drive parameters, and the resulting error rates of the readers. FIG. 18A illustrates the effect of a tape dimensional change resulting from, for example, a change in tension. The written Data Tracks have changed following a tape dimensional change. In this case of FIG. 18A, Reader 1 is aligned in the center of Data Track 1, however, each subsequent reader is offset from the center of its respective data track such that Data Track 5 has been shifted below Reader 5 to an extent that Data Track 5 may not be read.

Figure 18B:
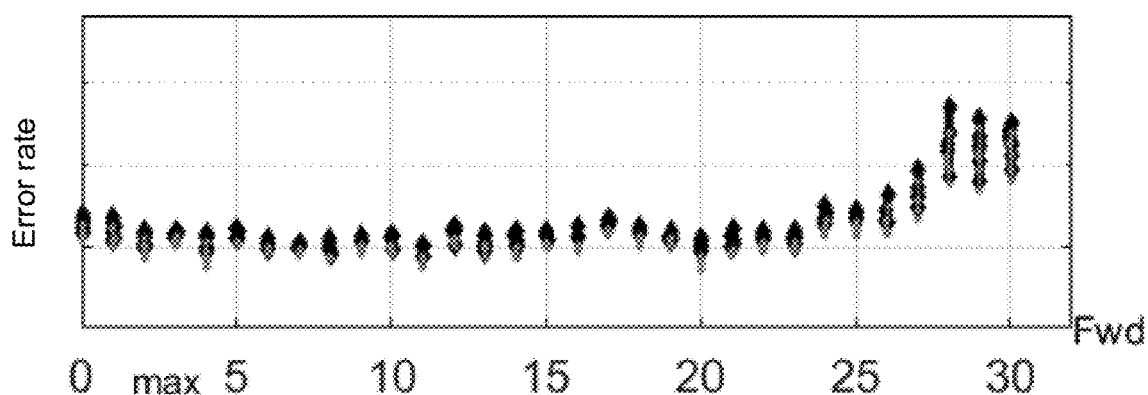
FIG. 18B is a chart exemplifying the increase in error rate toward one end of a reader array due to a misregistration of the readers at the outer end of the array.

The pattern of error rates of the readers as shown in the schematic diagram of FIG. 18A as affected by the tape dimensional change may be similar to the tape drive data of FIG. 18B that shows the error rates of written tracks read in the forward direction. The channels on the right side (tracks 28-32) have higher error rates whereas the channels on the left side have very low error rates. There is a mismatch between the write to read in the drive. Moreover, there is also a track centering problem because the right-side readers have error rates so high that they may be falling off the tracks with the error rates increasing whereas the error rates on the left-side tracks are low. The readers are not centered in the written tracks.

Figure 19A:
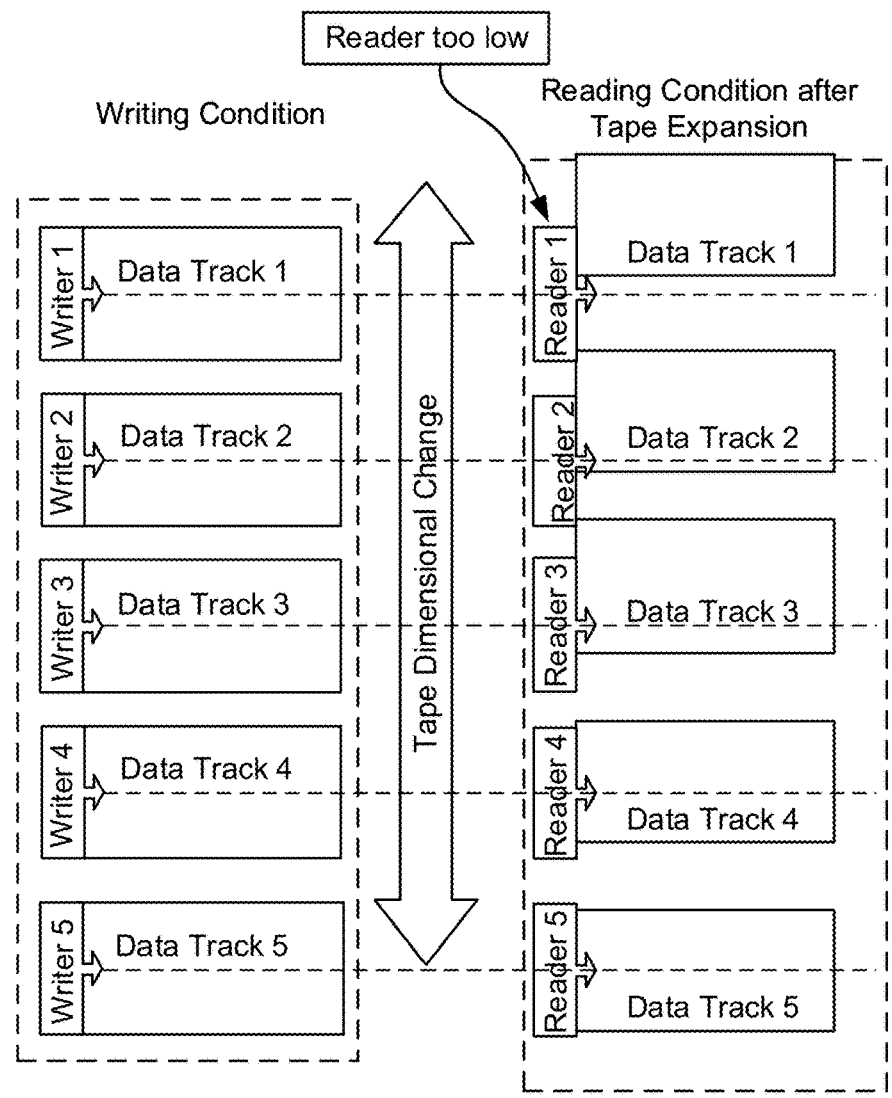
FIG. 19A is a representational diagram of the effect of tape dimensional change and consequential transducer misregistration.

FIG. 19A illustrates the effect of tape dimensional change, for example tape expansion due to adjusting the tape tension, when the readers read tracks written by the reverse writers. Reader 5 is aligned with the center of Data Track 5, but then due to the condition after tape expansion the subsequent readers are offset from the center of their respective tracks, so much so that by Data Track 1, Reader 1 is too low to read any of Data Track 1.

Figure 19B:
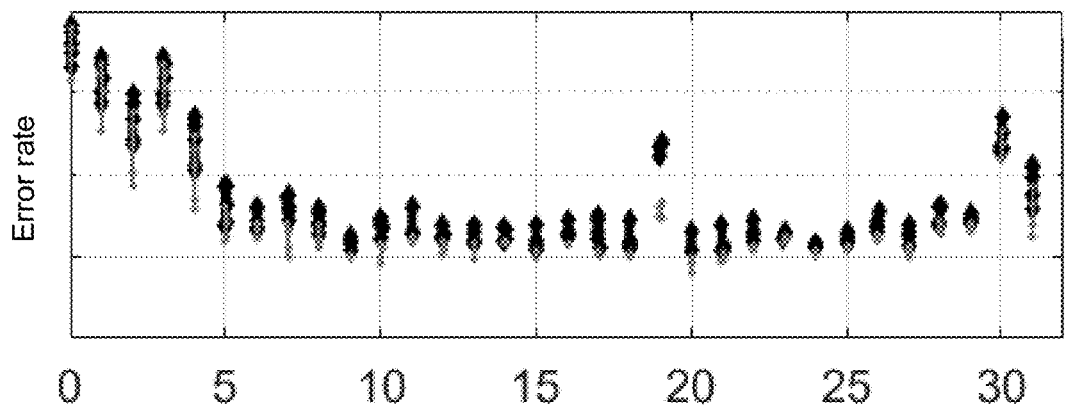
FIG. 19B is a chart exemplifying the increase in error rate toward one end of a reader array due to a misregistration of the readers at the outer end of the array.

FIG. 19B illustrates a similar pattern of error rates generated by readers reading the tracks written by the reverse writers. In the reverse direction, the channels on the left side (tracks 1-5) have error rates so high they may be falling off of the track and the channels on the right side have very low error rates thereby showing that the calibration for the writer offset is also wrong in the reverse direction.

Referring back to illustrative method 1700 in FIG. 17, the drive considers at decision 1708 whether the error rates are sufficiently symmetrical to indicate centered reading. If so, the present location is indicated as the optimum reading offset. If not, the head position may be laterally adjusted to various reader offsets in an effort to achieve sufficiently symmetrical error rates. The reader offset that provides the most equal values or sufficiently symmetrical error rates for both ends of the array may be selected as the reader offset that best centers the readers in the written track.

Decision 1708 may include comparing track error rates at opposite ends of the reader array at the present reader offset value, e.g., of only the edge readers, or multiple readers on each side up to about half of the total readers for each side. In some approaches, as shown in FIG. 18B, comparing readers/tracks 29 to 32 with readers/tracks 1-4 indicates that the error rates of the readers are not symmetrical. Ideally, sufficiently symmetrical error rates would be indicated when the error rates of about three of the outermost left readers/tracks are similar to error rates of about three of the outermost right readers/tracks. If the comparison shows that the average error rates for the outermost left readers/tracks and outermost right readers/tracks are the same, then the readers may be considered centered to read the written tracks.

Furthermore, using more than three readers from each far end of the array to determine symmetry of the error rates may provide a more robust assessment of symmetry and discount degraded readers/tracks. In some approaches, looking back to FIG. 19B, if only comparing one or two tracks on the outermost left readers/writers with one or two of the outermost right left readers/writers, then the symmetry of the readers may not be accurately assessed, e.g., due to the reader being a statistical outlier. Thus, more accurately, the error rate of least three of the outermost left readers/tracks are compared to the error rates of at least three of the outermost right readers/tracks to determine sufficient symmetry.

Thus, as in the case as shown in both FIGS. 18B and 19B, the error rates are not sufficiently symmetrical to indicate centered reading. Accordingly, operation 1712 of FIG. 17 uses the non-symmetry of the per track error rate to determine direction and magnitude to try for next reader offset. For example, the next reader offset may be determined by the difference between the error rates of the three outermost left readers/tracks and the error rates of the three outermost right readers/tracks. The direction of the next reader offset may be determined by the characteristics of this difference.

In some approaches, the severity of the observed TDS asymmetry as determined by the difference comparing the readers/tracks at each end of the array may be used as a metric to determine the extent and direction the reader offset may be moved to achieve sufficient symmetry of error rates of readers/tracks from each end of the array.

After setting a next reader offset, the drive may return to operation 1706 to measure per track error rates during reading of the shingled track at the next reader offset.

Figure 20A:
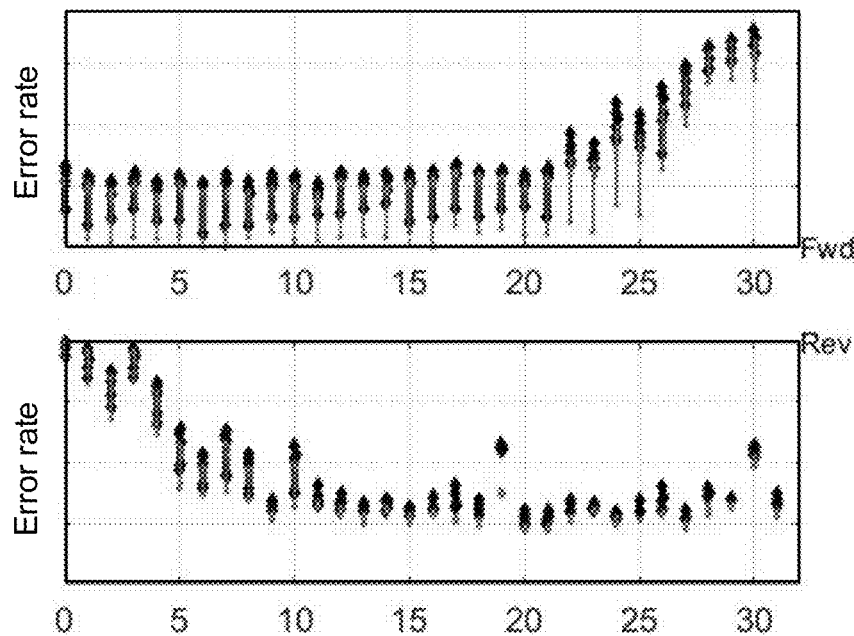
FIG. 20A is a set of charts exemplifying the increase in error rate toward one end of a reader array in both the forward and reverse reading direction due to a misregistration of the readers at the outer end of the array after applying a reader offset in the wrong direction.

FIG. 20A shows the change in error rates of the tracks read in a tape drive where the reader offset is adjusted in the wrong direction. The error rates increase for the readers/tracks at only one end of the array, whether in the forward direction (top figure) or reverse direction (bottom figure). The right side of the forward reading error rate distribution (top figure) and the left side of the reverse reading error rate distribution (bottom figure) exhibit rising error rates toward the respective edge, thereby suggesting that the offset needs to be a significant adjustment in the opposite direction to the shown reader offset to correct the asymmetry of the drive.

In the case of FIG. 20A, the drive may determine that since the difference in error rates increased with the next reader offset, then a reverse adjustment needs to be implemented, in the opposite direction of the reader offset of FIG. 20A.

Figure 20B:
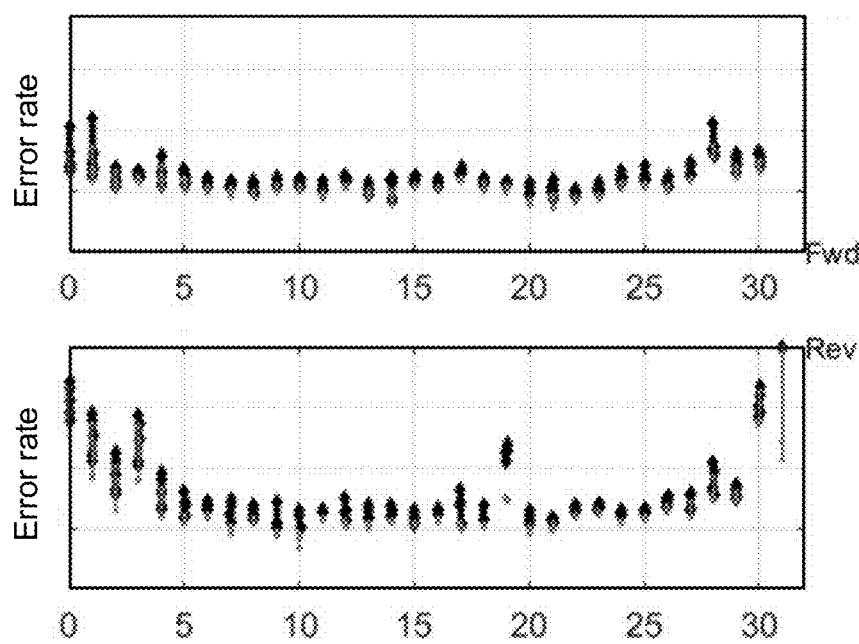
FIG. 20B is a set of charts exemplifying symmetrical error rates at each end of a reader array in both the forward and reverse reading direction after applying a reader offset in the correct direction.

FIG. 20B shows the error rates of a drive where the next reader offset is adjusted in the correct direction. As shown, the error rates of the readers/tracks at each end of the array are sufficiently symmetrical with slightly elevated error rates at each edge. The symmetrical pattern is generated whether the tracks are read in the forward direction (top figure) or the reverse direction (bottom figure).

Refering back to FIG. 17, when decision 1708 determines that the error rates are sufficiently symmetrical to indicate centered reading (for example, as shown in FIG. 20B), then method 1700 proceeds to operation 1710 to apply optimum reading offset as writer offset so that reading can be performed at the nominal location. The reader offset value is negated and applied to the writer offset. For example, and presented by way of example only and not meant to be limiting in any way, if a reader offset value of +3 generates sufficiently symmetrical error rates of the tracks read by readers offset by +3, then the writer offset may be adjusted to −3 so that the nominal location of the readers will be at the center of the written tracks by the drive at a writer offset of −3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, the method comprising:
   writing, using a magnetic head, a set of parallel shingled tracks onto a magnetic recording tape using specified drive parameters;
   changing one of the specified drive parameters;
   reading a set of selected data tracks on the magnetic recording tape using the changed drive parameter;
   changing a lateral head position while reading the set of selected data tracks using the changed drive parameter;
   comparing track error rates observed during reading at the different lateral head positions;
   selecting a reader offset value based on the comparing; and
   performing a further action using the selected reader offset value.

2. A method as recited in claim 1, wherein more than one of the drive parameters is changed for the reading.

3. A method as recited in claim 1, wherein the changed drive parameter is a tape tension setting.

4. A method as recited in claim 1, wherein the changed drive parameter is a servo band difference value.

5. A method as recited in claim 1, wherein the further action includes calculating a writer offset value, and storing the writer offset value in memory.

6. A method as recited in claim 1, wherein the selected reader offset value corresponds to the lateral head position having the lowest observed track error rates.

7. A method as recited in claim 1, wherein the comparison is of track error rates of only outermost readers of an array of readers used for the reading, wherein the selected reader offset value corresponds to the lateral head position having track error rates of the outermost readers that are most similar to one another.

8. An apparatus, comprising:
   a drive mechanism for passing a magnetic recording tape over a magnetic head; and
   a controller electrically coupled to the magnetic head, the controller being configured to:
   write, using the magnetic head, a set of parallel shingled tracks onto the magnetic recording tape using specified drive parameters;
   change one of the specified drive parameters;
   read a set of selected data tracks on the magnetic recording tape using the changed drive parameter;
   change a lateral head position while reading the set of selected data tracks using the changed drive parameter;
   compare track error rates observed during reading at the different lateral head positions;
   select a reader offset value based on the comparing; and
   perform a further action using the selected reader offset value.

9. An apparatus as recited in claim 8, wherein more than one of the drive parameters is changed for the reading.

10. An apparatus as recited in claim 8, wherein the changed drive parameter is a tape tension setting.

11. An apparatus as recited in claim 8, wherein the changed drive parameter is a servo band difference value.

12. An apparatus as recited in claim 8, wherein the further action includes calculating a writer offset value, and storing the writer offset value in memory.

13. An apparatus as recited in claim 8, wherein the selected reader offset value corresponds to the lateral head position having the lowest observed track error rates.

14. An apparatus as recited in claim 8, wherein the comparison is of track error rates of only outermost readers of an array of readers used for the reading, wherein the selected reader offset value corresponds to the lateral head position having track error rates of the outermost readers that are most similar to one another.

15. A computer program product for calibrating a tape drive, the computer program product comprising a computer readable storage medium having program instructions embodied therewith, the program instructions executable by the tape drive to cause the tape drive to:
   write, by the tape drive, a set of parallel shingled tracks onto a magnetic recording tape using specified drive parameters;
   change, by the tape drive, one of the specified drive parameters;
   read, by the tape drive, a set of selected data tracks on the magnetic recording tape using the changed drive parameter;
   change, by the tape drive, a lateral head position while reading the set of selected data tracks using the changed drive parameter;
   compare, by the tape drive, track error rates observed during reading at the different lateral head positions;
   select, by the tape drive, a reader offset value based on the comparing; and
   perform, by the tape drive, a further action using the selected reader offset value.

16. A computer program product as recited in claim 15, wherein more than one of the drive parameters is changed for the reading.

17. A computer program product as recited in claim 15, wherein the changed drive parameter is selected from the group consisting of a tape tension setting and a servo band difference value.

18. A computer program product as recited in claim 15, wherein the further action includes calculating a writer offset value, and storing the writer offset value in memory.

19. A computer program product as recited in claim 15, wherein the selected reader offset value corresponds to the lateral head position having the lowest observed track error rates.

20. A computer program product as recited in claim 15, wherein the comparison is of track error rates of only outermost readers of an array of readers used for the reading, wherein the selected reader offset value corresponds to the lateral head position having track error rates of the outermost readers that are most similar to one another.

* * * * *